(12) United States Patent
Atarashi et al.

(10) Patent No.: US 7,605,551 B2
(45) Date of Patent: Oct. 20, 2009

(54) CONTROLLER FOR MOTOR

(75) Inventors: Hirofumi Atarashi, Wako (JP); Kazuyuki Iwata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 11/826,816

(22) Filed: Jul. 18, 2007

(65) Prior Publication Data
US 2008/0019855 A1    Jan. 24, 2008

(30) Foreign Application Priority Data
Jul. 21, 2006    (JP) .............................. 2006-199332

(51) Int. Cl.
*H02K 7/14* (2006.01)
(52) U.S. Cl. ............................. 318/3; 318/700; 180/175
(58) Field of Classification Search ...................... 318/3, 318/14, 700, 705; 180/53.4, 175
See application file for complete search history.

(56) References Cited

U.S. PATENT DOCUMENTS

| | | | |
|---|---|---|---|
| 3,614,494 A * | 10/1971 | Borchers et al. .............. 310/56 |
| 4,305,031 A | 12/1981 | Wharton | |
| 5,167,292 A * | 12/1992 | Moiroux et al. ............. 180/165 |
| 5,245,238 A | 9/1993 | Lynch et al. | |
| 5,349,537 A * | 9/1994 | Burger et al. ................ 700/280 |
| 5,957,234 A * | 9/1999 | Manor ......................... 180/302 |
| 6,563,246 B1 | 5/2003 | Kaijura et al. | |

FOREIGN PATENT DOCUMENTS

JP    2002-204541 A    7/2002

* cited by examiner

*Primary Examiner*—Rina I Duda
(74) *Attorney, Agent, or Firm*—Arent Fox LLP.

(57) ABSTRACT

A controller for a motor cleans, as necessary, a hydraulic chamber that generates hydraulic oil for changing a phase difference between two rotors so as to restrain sludge from building up in the hydraulic chamber. A motor has a first rotor and a second rotor that can be relatively rotated with respect to the first rotor. The controller includes a phase difference changing driver that changes the phase difference between the two rotors by controlling the pressure in the hydraulic chamber filled with hydraulic oil. The controller further includes a cleaning need determiner that determines the need for cleaning the hydraulic chamber, and a cleaning phase difference controller that controls the phase difference changing driver such that the second rotor is relatively rotated in the forward direction and the reverse direction alternately with respect to the first rotor if a determination result of the cleaning need determiner is affirmative.

5 Claims, 10 Drawing Sheets

CONTROLLER FOR MOTOR

BACKGROUND OF THE INVENTION

1. Field of the Invention

The present invention relates to a controller for a motor which has two rotors individually producing fields by permanent magnets and which allows a phase difference between the two rotors to be changed.

2. Description of the Related Art

In a permanent-magnet type motor, there has conventionally been known a motor of a double-rotor structure in which each of two rotors coaxially disposed has permanent magnets that produce fields (refer to, for example, Japanese Patent Application Publication No. 2002-204541 (hereinafter referred to as patent document 1)). In this type of motor, the two rotors can be relatively rotated about their axes. The relative rotation allows a phase difference between the two rotors to be changed. Further, changing the phase difference between the two rotors makes it possible to change the intensity of a resultant field (the magnitude of a magnetic flux) obtained by combining the fields produced by the permanent magnets of the rotors.

The motor disclosed in the aforesaid patent document 1 is constructed such that the phase difference between the two rotors mechanically changes according to the rotational velocity of the motor. More specifically, the two rotors are connected through the intermediary of a member that is displaced in the radial direction of the motor when subjected to a centrifugal force. One of the two rotors is configured such that it can rotate integrally with an output shaft that outputs generated torque of the motor to an external source. Further, the other rotor is configured such that, as the aforesaid member is displaced, the other rotor relatively rotates with respect to the other rotor that can rotate integrally with the output shaft, thereby changing the phase difference between the two rotors. In this case, the permanent magnets of the rotors are arranged such that, when the motor is at a halt, the magnetic poles, i.e., the magnetic fluxes, of the permanent magnets provided in the two rotors are oriented in the same direction, causing a resultant field of the permanent magnets to provide a highest intensity. As the rotational velocity of the motor increases, the phase difference between the two rotors changes due to a centrifugal force and the intensity of the resultant field of the permanent magnets of the two rotors decreases.

As described above, in the motor wherein the intensity of a resultant field of the permanent magnets of the two rotors can be changed, an expanded operating range of the motor and higher energy efficiency of the motor can be effectively achieved by properly changing the resultant field.

However, in the motor disclosed in the aforesaid patent document 1, the phase difference between the rotors is simply mechanically changed according to the rotational velocity of the output shaft, making it difficult to accomplish detailed control. Therefore, it has been difficult to effectively expand the operating range of the motor or to effectively improve the energy efficiency of the motor.

Hence, the present applicant has made an attempt to actively control the phase difference between the rotors by using, for example, a hydraulic device. For instance, a hydraulic chamber whose volume changes as a second rotor relatively rotates is created beforehand, and the second rotor is rotated relatively to a first rotor by the pressure of hydraulic oil charged in the hydraulic chamber.

Using the hydraulic device makes it possible to control the phase difference between the rotors to a desired phase difference by adjusting the pressure in the hydraulic chamber. Consequently, the intensity of a resultant field of the two rotors can be controlled to a desired intensity.

In general, however, the phase difference between the two rotors need not be frequently changed, and it is maintained to be constant in many cases. For this reason, sludge tends to build up in the hydraulic chamber. Such accumulated sludge may cause a failure of the mechanism for changing the phase difference between the rotors. An example of the failure is unsmooth rotation of the other rotor of the two rotors relative to the rotor that can be integrally rotated with the output shaft. Hence, there has been a demand for measures for removing the sludge, as necessary.

SUMMARY OF THE INVENTION

The present invention has been made with a view of the background described above, and it is an object of the invention to provide a controller for a motor that makes it possible to cleaning, as necessary, a hydraulic chamber that produces a hydraulic pressure to change a phase difference between two rotors, thereby restraining sludge from accumulating in the hydraulic chamber. Another object of the present invention is to provide a controller for a motor that makes it possible to perform a required operation of the motor while carrying out the cleaning.

To this end, according to the present invention, there is provided a controller for a motor having a first rotor and a second rotor that produce fields by permanent magnets, and an output shaft that can be integrally rotated with the first rotor of the two rotors, wherein the two rotors and the output shaft are coaxially provided, the second rotor is provided such that the second rotor can be rotated relatively to the first rotor, and the phase difference between the two rotors is changed by the relative rotation of the second rotor so as to change the intensity of a resultant field obtained by combining the fields of the permanent magnets of the rotors, the controller for a motor including: a phase difference changing driver which has a hydraulic chamber whose volume changes as the second rotor relatively rotates, and causes the second rotor to rotate relatively to the first rotor by a pressure of hydraulic oil charged in the hydraulic chamber, a cleaning need determiner which determines whether the hydraulic chamber needs to be cleaned, and a cleaning phase difference controller which controls the phase difference changing driver such that the second rotor relatively rotates in the forward direction and the reverse direction alternately with respect to the first rotor in the case where the cleaning need determiner determines that cleaning is necessary (a first aspect of invention).

According to the first aspect of the invention, the phase difference changing driver is provided, so that the phase difference between the two rotors can be controlled to a desired phase difference through the intermediary of the phase difference changing driver. Further, if the cleaning need determiner determines that the hydraulic chamber needs to be cleaned, then the cleaning phase difference controller controls the phase difference changing driver to relatively rotate the second rotor in the forward direction and the reverse direction alternately with respect to the first rotor (hereinafter, the relative rotational operation of the second rotor may be referred to as "the forward/reverse alternate rotation"). At this time, the forward/reverse alternate rotation of the second rotor alternately supplies the hydraulic oil to the hydraulic chamber and discharges the hydraulic oil from the hydraulic chamber, thus expanding and contracting the volume of the hydraulic chamber. This allows sludge in the hydraulic chamber to flow out of the hydraulic chamber, thereby restraining the sludge from building up in the hydraulic chamber.

In the aforesaid first aspect of the invention, controlling the phase difference changing driver by the cleaning phase difference controller, that is, the alternate forward/reverse rotation of the second rotor causes the intensity of the resultant field of the permanent magnets of the two rotors to vary in a vibrating manner. It is desirable, therefore, to carry out the alternate forward/reverse rotation of the second rotor for cleaning the hydraulic chamber such that the varying intensity of the resultant field does not affect an operating condition of generated torque or the like of the motor.

In this case, for example, the cleaning phase difference controller includes a first operating condition determiner that determines, in the case where the cleaning need determiner determines that cleaning is necessary, whether an operating condition of the motor is equivalent to an operating condition in the case where it is assumed that the energization of an armature of the motor has been cut off, wherein in the case where a determination result given by the first operating condition determiner is affirmative, then the cleaning phase difference controller controls the phase difference changing driver so as to relatively rotate the second rotor in the forward direction and the reverse direction alternately with respect to the first rotor while controlling an energizing circuit of the armature to cut off the energization of the armature of the motor (a second aspect of the invention).

According to the second aspect of the invention, when the hydraulic chamber needs to be cleaned, if the operating condition of the motor is equivalent to the operating condition in the case where it is assumed that the energization of the armature of the motor has been cut off, then the energization of the armature of the motor is cut off while carrying out the alternate forward/reverse rotation of the second rotor. In this case, in the state wherein the energization has been cut off, fluctuations in the resultant field attributable to the alternate forward/reverse rotation of the second rotor do not affect the operating condition of the motor. Thus, the hydraulic chamber can be cleaned by carrying out the alternate forward/reverse rotation of the second rotor while substantially maintaining the motor in a proper operating condition.

In the second aspect of the invention, if, for example, an inverter circuit is used as the energizing circuit, then the energization of the armature is cut off by turning off all gate elements, namely, switching elements, of the inverter circuit.

The operating condition equivalent to the operating condition in which the energization of the armature of the motor has been cut off refers to an operating condition in which a required torque of the motor is zero and the rotational velocity of the output shaft of the motor is a low velocity of a predetermined value or less.

Further, for example, the cleaning phase difference controller includes a second operating condition determiner that determines, in the case where the cleaning need determiner determines that cleaning is necessary, whether an operating condition of the motor is equivalent to an operating condition in the case where it is assumed that an armature of the motor has been short-circuited, wherein in the case where a determination result given by the second operating condition determiner is affirmative, then the cleaning phase difference controller controls the phase difference changing driver so as to relatively rotate the second rotor in the forward direction and the reverse direction alternately with respect to the first rotor while controlling the energizing circuit of the armature to short-circuit the armature of the motor (a third aspect of the invention).

According to the third aspect of the invention, when the hydraulic chamber needs to be cleaned, if the operating condition of the motor is equivalent to the operating condition in which it is assumed that the armature of the motor has been short-circuited, then the armature of the motor is short-circuited while carrying out the alternate forward/reverse rotation of the second rotor. Short-circuiting the armatures means to short-circuit a pair of terminals, to which voltages are applied, of a winding of the armature (or a winding of each phase for an armature of a plurality of phases). In this case, in the state wherein the armature has been short-circuited, fluctuations in the resultant field attributable to the alternate forward/reverse rotation of the second rotor do not affect the operating condition of the motor. Thus, the hydraulic chamber can be cleaned by carrying out the alternate forward/reverse rotation of the second rotor while substantially maintaining the motor in a proper operating condition.

In the third aspect of the invention, if, for example, an inverter circuit is used as the energizing circuit, then the energization of the armature is cut off by turning on all gate elements, namely, switching elements, of at least one of an upper arm and a lower arm of the inverter circuit.

The operation condition equivalent to the operating condition wherein it is assumed that the armature of the motor has been short-circuited refers to an operating condition in which a required torque of the motor is a predetermined regenerative torque (preferably an operating condition in a high-velocity range in which a rotational velocity of the output shaft of the motor is a predetermined value or more).

Supplementally, the third aspect of the invention may be combined with the second aspect of the invention.

Further, the controller for a motor may include an energization controller that estimates or detects a phase difference between the two rotors or a value of a characteristic parameter of the motor that has a predetermined correlation with the phase difference and controls energizing current to an armature of the motor, by using the phase difference or the value of the characteristic parameter that has been estimated or detected, while at least the cleaning phase difference controller is controlling the phase difference changing driver to relatively rotate the second rotor in the forward direction or the reverse direction alternately with respect to the first rotor (a fourth aspect of the invention).

According to the fourth aspect of the invention, while carrying out the alternate forward/reverse rotation of the second rotor to clean the hydraulic chamber, the phase difference between the two rotors or the value of a characteristic parameter (e.g., an induced voltage constant) of the motor that has a predetermined correlation with the phase difference is estimated or detected, and the estimated or detected phase difference or the value of the characteristic parameter is used to control the energizing current to an armature of the motor. This makes it possible to control the energizing current to the armature of the motor so as to generate a desired torque (a required torque) in the motor while carrying out the alternate forward/reverse rotation of the second rotor.

The fourth aspect of the invention may be combined with the second aspect of the invention and/or the third aspect of the invention. In that case, if, for example, a determination result in the first operating condition determiner in the second aspect of the invention is negative or if a determination result in the second operating condition determiner in the third aspect of the invention is negative, or if the determination results in both of the operating condition determiners are negative, then the energizing current to the armature of the motor may be controlled while carrying out the alternate forward/reverse rotation of the second rotor, as described in the fourth aspect of the invention.

Preferably, in the first to the fourth aspects of the invention described above, the cleaning need determiner determines whether the hydraulic chamber needs to be cleaned on the basis of at least one of the rotational velocity of the output shaft of the motor and the operating time of the motor (a fifth aspect of the invention).

More specifically, the amount of accumulated sludge in the hydraulic chamber tends to be dependant on the rotational velocity of the output shaft of the motor or the operating time of the motor, so that the need for cleaning the hydraulic chamber can be accurately determined on the basis of at least one of the rotational velocity and the operating time.

DESCRIPTION OF THE PREFERRED EMBODIMENTS

Figure 1:
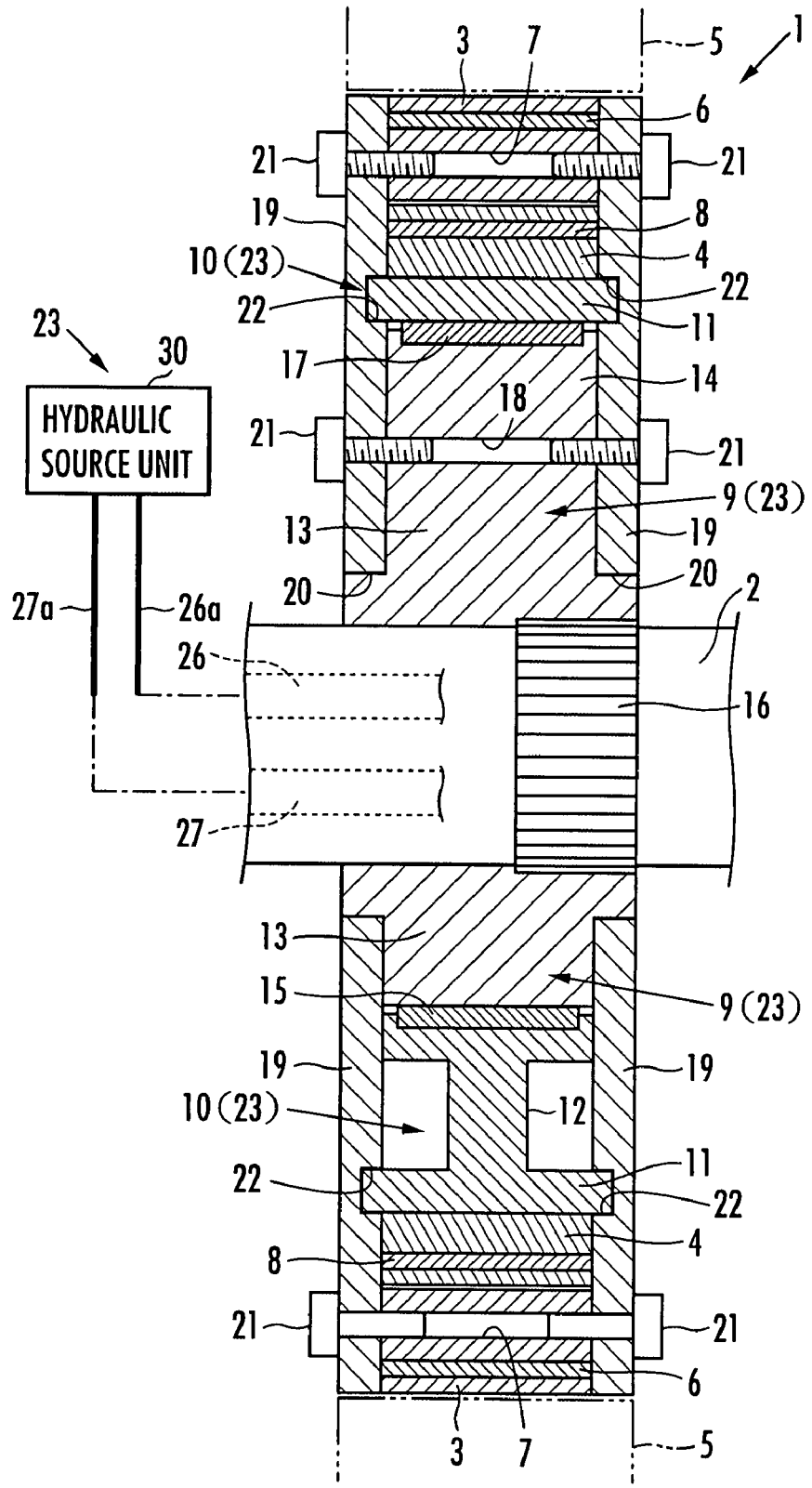
FIG. 1 is a sectional view of an essential section of a motor in an embodiment of the present invention.
Figure 2:
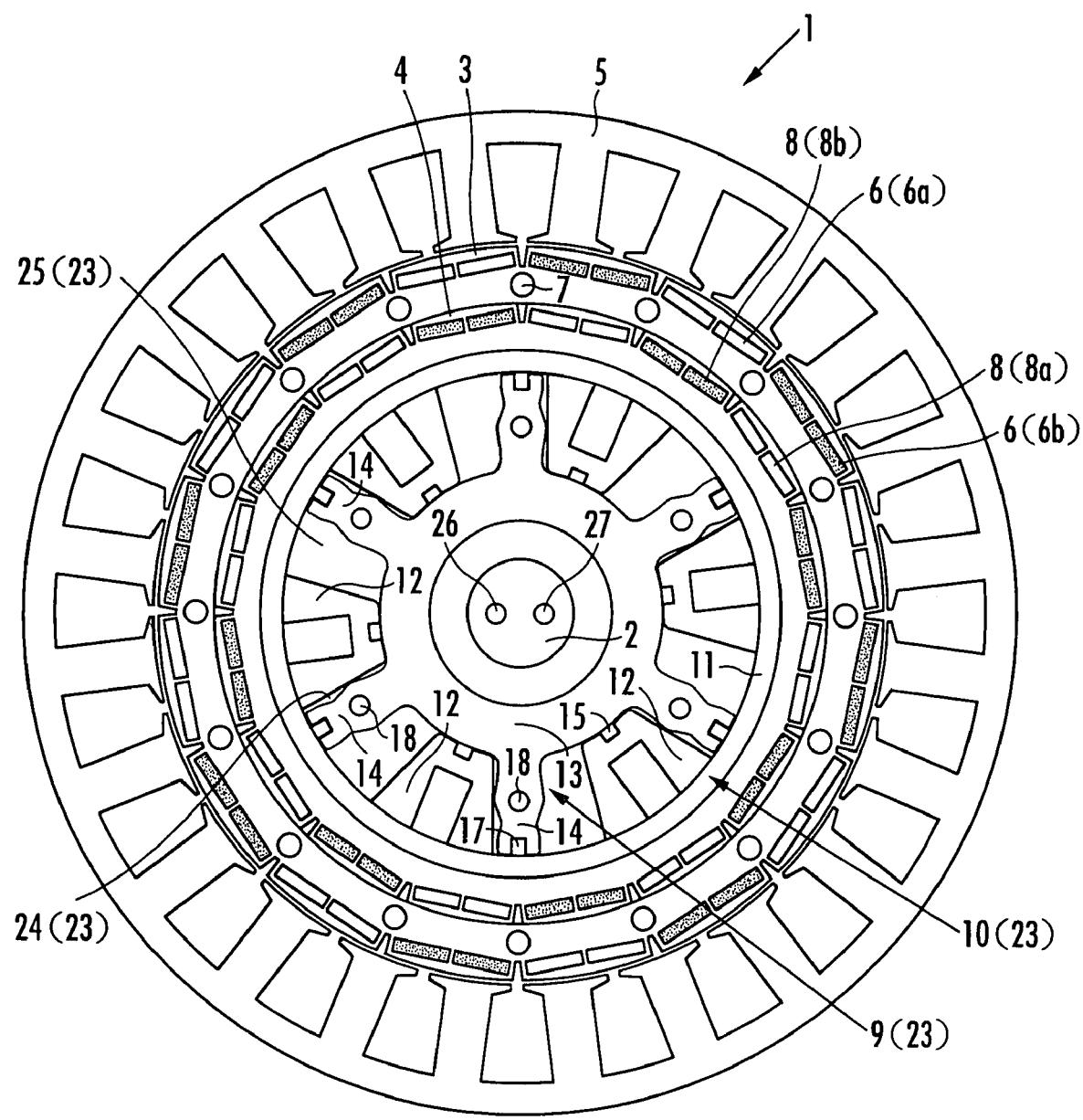
FIG. 2 is a diagram showing the motor in the axial direction of the motor, a drive plate of the motor shown in FIG. 1 having been removed.
Figure 3:
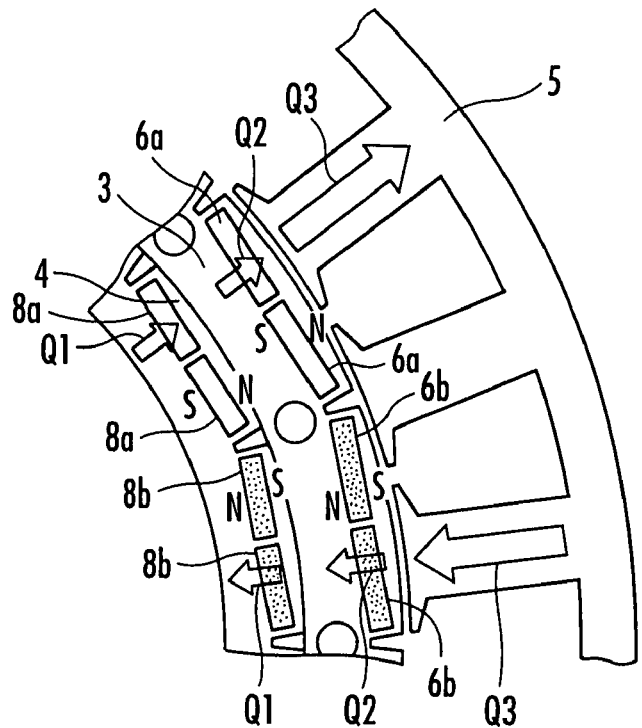
FIG. 3(a) is a diagram showing a phase relationship between an inner rotor and an outer rotor of the motor in a maximum field state.
FIG. 3(b) is a diagram showing a phase relationship between the inner rotor and the outer rotor of the motor in a minimum field state.
Figure 3:
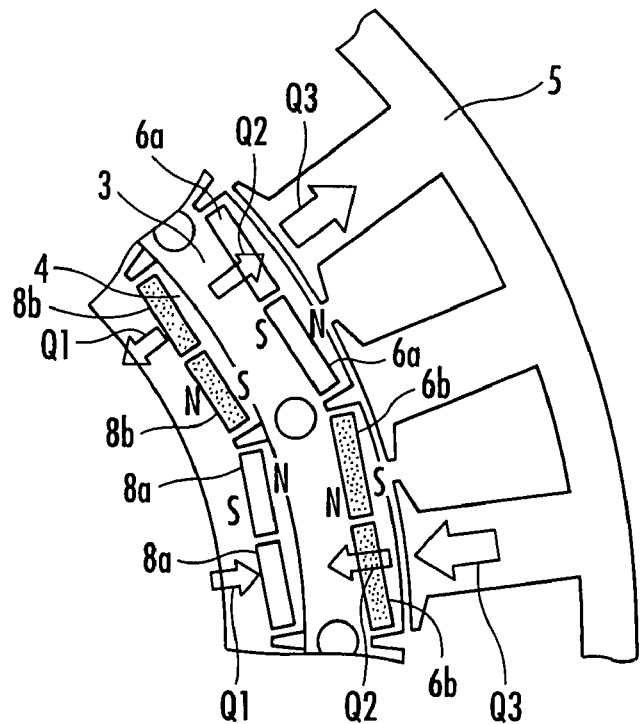

An embodiment of the present invention will be explained with reference to FIG. 1 to FIG. 10. FIG. 1 is a sectional view of an essential section of a motor in the present embodiment, and FIG. 2 is a diagram showing the motor in the axial direction of the motor, a drive plate 19 of the motor shown in FIG. 1 having been removed.

Referring to FIG. 1, a motor 1 is a DC brushless motor having a double-rotor structure and equipped with an output shaft 2, an outer rotor 3, and an inner rotor 4, which are coaxially disposed. The outer rotor 3 and the inner rotor 4 correspond to a first rotor and a second rotor in the present invention. On the outer side of the outer rotor 3, there is a stator 5 secured to a housing (not shown) of the motor 1, and an armature for three phases (not shown) is attached to the stator 5. The motor 1 is mounted in a vehicle as a traveling motive power source of, for example, a hybrid vehicle or an electric car, and capable of operating as a motor to perform power running and also operating as a generator to perform regenerative operation.

The outer rotor 3, which has an annular shape, is provided with a plurality of permanent magnets 6 disposed in the circumferential direction thereof substantially at equal intervals. Each of the permanent magnets 6, which is formed like a long square-shaped plate, is buried in the outer rotor 3 such that the lengthwise direction thereof is set in the axial direction of the outer rotor 3 and the normal direction thereof is set in the radial direction of the outer rotor 3. Further, the outer rotor 3 has a plurality of tapped holes 7 having axes that are parallel to the axis of the outer rotor 3. These tapped holes 7 are disposed in the circumferential direction of the outer rotor 3 at equal intervals.

The inner rotor 4 also has an annular shape. The inner rotor 4 is disposed inside the outer rotor 3 such that it is coaxial with the outer rotor 3, the outer peripheral surface of the inner rotor 4 being in slidable contact with the inner peripheral surface of the outer rotor 3. A small clearance may be provided between the outer peripheral surface of the inner rotor 4 and the inner peripheral surface of the outer rotor 3. Further, the output shaft 2 penetrates the axial portion of the inner rotor 4 such that it is coaxial with the inner rotor 4 and the outer rotor 3. In this case, the inside diameter of the inner rotor 4 is larger than the outside diameter of the output shaft 2, so that a clearance is provided between the outer peripheral surface of the output shaft 2 and the inner peripheral surface of the inner rotor 4.

The inner rotor 4 has a plurality of permanent magnets 8 disposed in the circumferential direction substantially at equal intervals. Each of the permanent magnets 8 has the same shape as that of each of the permanent magnets 6 of the outer rotor 3, and the permanent magnets 8 are buried in the inner rotor 4 in the same manner as with the outer rotor 3. The number of the permanent magnets 8 of the inner rotor 4 is the same as that of the permanent magnets 6 of the outer rotor 3.

Referring now to FIG. 2, of the permanent magnets 6 of the outer rotor 3, permanent magnets 6a indicated by blanks and permanent magnets 6b indicated by stipples have their magnetic poles in the radial direction of the outer rotor 3 oriented in the opposite directions from each other. For example, the outer surface (adjacent to the outer peripheral surface of the outer rotor 3) of each of the permanent magnets 6a provides the north pole, while the inner surface thereof (adjacent to the inner peripheral surface of the outer rotor 3) provides the south pole, and the outer, surface of each of the permanent magnets 6b provides the south pole, while the inner surface thereof provides the north pole. Similarly, of the permanent magnets 8 of the inner rotor 4, permanent magnets 8a indicated by blanks and permanent magnets 8b indicated by stipples have their magnetic poles in the radial direction of the inner rotor 4 oriented in the opposite directions from each other. For example, the outer surface (adjacent to the outer peripheral surface of the inner rotor 4) of each of the permanent magnets 8a provides the north pole, while the inner surface thereof (adjacent to the inner peripheral surface of the inner rotor 4) provides the south pole, and the outer surface of each of the permanent magnets 8b provides the south pole, while the inner surface thereof provides the north pole.

According to the present embodiment, in the outer rotor 3, a pair of adjacent permanent magnets 6a, 6a and a pair of adjacent permanent magnets 6b, 6b are disposed alternately in the circumferential direction of the outer rotor 3, as shown in FIG. 2. Similarly, in the inner rotor 4, a pair of adjacent permanent magnets 8a, 8a and a pair of adjacent permanent magnets 8b, 8b are disposed alternately in the circumferential direction of the inner rotor 4.

A first member 9 and a second member 10 are provided between the inner side of the inner rotor 4 and the outer peripheral surface of the output shaft 2. The first member 9 and the second member 10 form a plurality of hydraulic chambers 24 and 25 on the inner side of the inner rotor 4.

The second member 10 has an annular portion 11 and a plurality of projections 12 protrusively provided in the radial direction toward the center of the annular portion 11 from the inner peripheral surface of the annular portion 11 (hereinafter referred to as "the second member projections 12" in some cases). The second member 10 is fixed coaxially with the inner rotor 4 by coaxially inserting the annular portion 11 into the inner rotor 4. The projections 12 adjacent to the second member are provided in the circumferential direction at equal intervals.

The first member 9, which is shaped like a vane rotor, has an annular portion 13 serving as a shaft portion thereof and a plurality of projections 14 (hereinafter referred to as "the first member projections 14" in some cases) protrusively provided in the radial direction from the outer peripheral surface of the annular portion 13. The annular portion 13 of the first member 9 is provided coaxially with the annular portion 11 on the inner side of the annular portion 11 of the second member 10. The distal ends of the projections 12 of the second member 10 are placed in slidable contact with the outer peripheral surface of the annular portion 13 through the intermediary of a sealing member 15. Further, the annular portion 13 of the first member 9 is externally inserted in the output shaft 2, and the inner peripheral surface thereof is fitted in a spline 16 formed on the outer peripheral surface of the output shaft 2. The spline fitting allows the first member 9 to rotate integrally with the output shaft 2.

The number of the first member projections 14 is the same as the number of the second member projections 12, the projections 14 being disposed in the circumferential direction at equal intervals. In this case, each of the first member projections 14 is sandwiched between two second member projections 12, 12 adjoining in the circumferential direction. In other words, the first member 9 and the second member 10 engage with each other such that the projections 14 and 12 are alternately arranged in the circumferential direction. The distal ends of the first member projections 14 are in slidable contact with the inner peripheral surface of the annular portion 11 of the second member 10 through the intermediary of a sealing member 17. Further, each of the first member projections 14 is provided with a tapped hole 18 having an axis parallel to the axis of the annular portion 13.

Referring to FIG. 1, disc-shaped drive plates 19, 19 are attached to both end surfaces of the outer rotor 3 in the axial direction such that they are coaxial with the outer rotor 3. Each of the drive plates 19 and 19 has a hole 20 which is larger than the outside diameter of the output shaft 2 at the center (axis) thereof. The output shaft 2 coaxially penetrates the hole 20, and each end of the annular portion 13 of the first member 9 is fitted in the hole 20. The drive plates 19 are fastened with bolts 21 into the tapped holes 7 of the outer rotor 3 and the tapped holes 18 of the projections 14 of the first member 9. Thus, the outer rotor 3 and the first member 9 are connected such that they can integrally rotate. In this case, as described above, the first member 9 can rotate integrally with the output shaft 2 by the spline fitting, so that the outer rotor 3 can also integrally rotate with the output shaft 2.

The drive plates 19 and 19 support the inner rotor 4 and the second member 10 therebetween. Specifically, the surfaces of the drive plates 19 and 19 that oppose each other have annular grooves 22, which are coaxially formed. Each end of the annular portion 11 of the second member 10 is slidably inserted in the annular groove 22. Thus, the inner rotor 4 and the second member 10 are supported by the drive plates 19 and 19 through the intermediary of the annular portion 11 and can be relatively rotated with respect to the outer rotor 3, the first member 9, and the output shaft 2 along the annular grooves 22 of the drive plates 19 and 19.

The first member 9 and the second member 10 are constituent elements of the phase difference changing driver 23 that causes the inner rotor 4 to relatively rotate with respect to the outer rotor 3 thereby to change the phase difference between the two rotors 3 and 4. This phase difference changing driver 23 has a plurality of pairs (the same number of pairs as that of the projections 12 and 14) of hydraulic chambers 24 and 25, which are formed as shown in FIG. 2, in the space formed by the first member 9 and the second member 10 by being surrounded by the annular portion 13 of the first member 9, the annular portion 11 of the second member 10, and the drive plates 19 and 19. More detailedly, of the space between the annular portion 11 of the second member 10 and the annular portion 13 of the first member 9, the spaces between each of the second member projection 12 and the two first member projections 14 and 14 that exist on both sides of the projection 12 (on both sides in the circumferential direction) provide hydraulic chambers 24 and 25 into and out from which hydraulic oil flows. In this case, the hydraulic chamber 24 on one side of the second member projection 12 is in communication with an oil passage 26 provided inside the output shaft 2 through an oil passage (not shown) formed in the annular portion 13 of the first member 9, the hydraulic chamber 24 being filled with hydraulic oil. Similarly, the hydraulic chamber 25 on the other side of the second member projection 12 is in communication with an oil passage 27 provided separately from the oil passage 26 inside the output shaft 2 through an oil passage (not shown) formed in the annular portion 13 of the first member 9, the hydraulic chamber 25 being filled with hydraulic oil. In this case, if the hydraulic pressure in the hydraulic chamber 24 is increased, then the hydraulic pressure turns into a pressure that urges the inner rotor 4 to relatively rotate clockwise in FIG. 2 with respect to the outer rotor 3. If the pressure or hydraulic pressure in the hydraulic chamber 25 is increased, then the hydraulic pressure turns into a pressure that urges the inner rotor 4 to relatively rotate counterclockwise in FIG. 2 with respect to the outer rotor 3. One of the clockwise direction and the counterclockwise direction means the direction of forward rotation of the inner rotor 4, while the other means the direction of reverse rotation.

Further, as shown in FIG. 1, the phase difference changing driver 23 is provided with a hydraulic source unit 30 connected to the oil passages 26 and 27 of the output shaft 2 outside the motor 1. The hydraulic source unit 30 controls the supply of hydraulic oil to the hydraulic chambers 24 and 25 thereby to increase or decrease the pressures in the hydraulic chambers 24 and 25. In this case, a pressure difference between the hydraulic chambers 24 and 25 generates a torque that urges the inner rotor 4 to rotate together with the second member 10 with respect to the outer rotor 3 and the first member 9. More specifically, a pressure difference produced by increasing the pressure in the hydraulic chamber 24 to be higher than that in the hydraulic chamber 25 generates the torque that urges the inner rotor 4 to rotate clockwise in FIG. 2 with respect to the outer rotor 3. Conversely, a pressure difference produced by increasing the pressure in the hydraulic chamber 25 to be higher than that in the hydraulic chamber 24 generates the torque that urges the inner rotor 4 to rotate counterclockwise in FIG. 2 with respect to the outer rotor 3. Thus, the phase difference changing driver 23 increases or decreases the pressures in the hydraulic chambers 24 and 25 to rotate the inner rotor 4 relative to the outer rotor 3 by manipulating the pressure differences therebetween, i.e., by changing the phase difference between the two rotors 3 and 4.

Supplementally, magnetic forces acting between the permanent magnets 8a and 8b of the inner rotor 4 and the permanent magnets 6a and 6b of the outer rotor 3 cause the inner rotor 4 to balance in a state wherein the permanent magnets 8a and 8b and the permanent magnets 6a and 6b of the outer rotor 3 oppose each other with opposite poles from each other, i.e., in a state wherein the permanent magnets 8a and 8b respectively face with the permanent magnets 6a and 6b, respectively. Hence, if the inner rotor 4 is rotated relative to the outer rotor 3 from the balanced state, then a torque that urges the inner rotor 4 to return to the balanced state (hereinafter referred to "the magnetic force torque" in some cases) is generated. Hence, to rotate the inner rotor 4 relative to the outer rotor 3 by a pressure difference between the hydraulic chambers 24 and 25, it is necessary to manipulate the pressures in the hydraulic chambers 24 and 25 so as to cause a torque against the magnetic force torque to act on the inner rotor 4 through the intermediary of the second member 10. The magnetic force torque changes according to the phase difference between the inner rotor 4 and the outer rotor 3 (hereinafter referred to as "the inter-rotor phase difference θd").

The above has described the mechanical construction of the motor 1 and the phase difference changing driver 23.

The present embodiment has been constructed such that the output shaft 2 and the outer rotor 3 of the motor 1 integrally rotate. Alternatively, however, the output shaft and the inner rotor may integrally rotate, and the outer rotor may relatively rotate with respect to the output shaft and the inner rotor. Further, the construction of the phase difference changing driver is not limited to the one described above. For instance, the inner rotor may be relatively rotated with respect to the outer rotor through the intermediary of a mechanism that converts a translatory movement of a piston of a translatory cylinder into a rotary movement. In this case, the inner rotor may be relatively rotated with respect to the outer rotor through the intermediary of, for example, a planetary gear mechanism.

The inner rotor 4 is rotated with respect to the outer rotor 3 by the phase difference changing driver 23 to change the inter-rotor phase difference θd between the two rotors 3 and 4, thereby changing the intensity of the resultant field (the intensity of a radial magnetic flux toward the stator 5) obtained by combining the fields generated by the permanent magnets 8a and 8b of the inner rotor 4 and the fields generated by the permanent magnets 6a and 6b of the outer rotor 3. Hereinafter, a state wherein the intensity of the resultant field reaches a maximum level will be referred to as the maximum-field state, and a state wherein the intensity of the resultant field reaches a minimum level will be referred to as the minimum-field state. FIG. 3(a) shows a phase relationship between the inner rotor 4 and the outer rotor 3 in the maximum-field state, and FIG. 3(b) shows a phase relationship between the inner rotor 4 and the outer rotor 3 in the minimum-field state.

As shown in FIG. 3(a), the maximum-field state is a state wherein the permanent magnets 8a and 8b of the inner rotor 4 and the permanent magnets 6a and 6b of the outer rotor 3 oppose with opposite poles facing with each other. More detailedly, in this maximum-field state, the permanent magnet 8a of the inner rotor 4 faces against the permanent magnet 6a of the outer rotor 3, while the permanent magnet 8b of the inner rotor 4 faces against the permanent magnet 6b of the outer rotor 3. In this state, in the radial direction, the direction of a magnetic flux Q1 of each of the permanent magnets 8a and 8b of the inner rotor 4 and the direction of a magnetic flux Q2 of each of the permanent magnets 6a and 6b of the outer rotor 3 are the same, thus providing a maximum intensity of a resultant magnetic flux Q3 (intensity of a resultant field) of the magnetic fluxes Q1 and Q2. This maximum field state is the aforesaid balanced state.

Further, as shown in FIG. 3(b), the minimum-field state is a state wherein the permanent magnets 8a and 8b of the inner rotor 4 and the permanent magnets 6a and 6b of the outer rotor 3 oppose with the same poles facing with each other. More detailedly, in this minimum-field state, the permanent magnet 8a of the inner rotor 4 faces against the permanent magnet 6b of the outer rotor 3, while the permanent magnet 8b of the inner rotor 4 faces against the permanent magnet 6a of the outer rotor 3. In this state, in the radial direction, the direction of the magnetic flux Q1 of each of the permanent magnets 8a and 8b of the inner rotor 4 and the direction of a magnetic flux Q2 of each of the permanent magnets 6a and 6b of the outer rotor 3 are opposite from each other, thus providing a minimum intensity of the resultant magnetic flux Q3 (intensity of a resultant field) of the magnetic fluxes Q1 and Q2.

In the present embodiment, the inter-rotor phase difference θd in the maximum-field state is defined as 0[deg] and the inter-rotor phase difference θd in the minimum-field state is defined as 180[deg]. The inter-rotor phase difference θd based on the definition is generally different from a mechanical rotational angle difference between the inner rotor 4 and the outer rotor 3.

Figure 4:
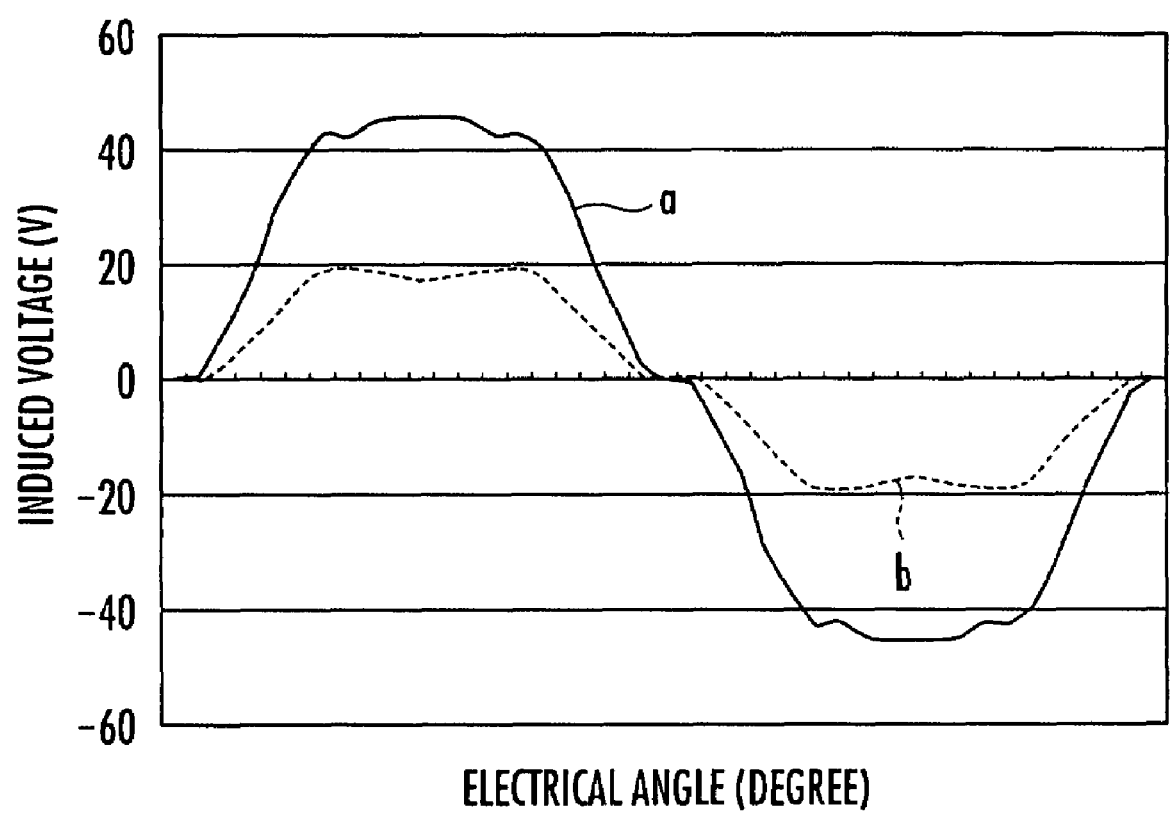
FIG. 4 is a graph showing induced voltages in an armature of the motor in the maximum field state and in the minimum field state.

FIG. 4 shows a graph comparing induced voltages that are induced in an armature of the stator 5 when the output shaft 2 of the motor 1 is operated at a predetermined rotational velocity in the maximum-field state and the minimum-field state. In the graph, the axis of ordinates indicates the induced voltage [V] and the axis of abscissas indicates the rotational angle [degrees] of the output shaft 2 in terms of electrical angle. The curve marked with a reference characteristic "a" relates to the maximum-field state, which is a state wherein the inter-rotor phase difference θd=0[deg]. The curve marked with a reference characteristic "b" relates to the minimum-field state, which is a state wherein the inter-rotor phase difference θd=180[deg]. As can be seen from FIG. 4, the level (amplitude level) of the induced voltage can be changed by switching the inter-rotor phase difference θd between 0[deg] and 180[deg]. As the inter-rotor phase difference θd is increased to 0[deg] and 180[deg], the intensity of the resultant field decreases and the level of the induced voltage decreases accordingly.

Thus, an induced voltage constant Ke, which is one of the characteristic parameters of the motor 1, can be changed by changing the inter-rotor phase difference θd thereby to increase or decrease the intensity of a resultant field. The induced voltage constant Ke is a proportional constant that defines the relationship between angular velocities of the output shaft 2 of the motor 1 and induced voltages generated in an armature on the basis of the angular velocities. The values of the induced voltage constant Ke decrease as the inter-rotor phase difference θd is increased from 0[deg] to 180[deg], as will be discussed hereinafter.

Figure 5:
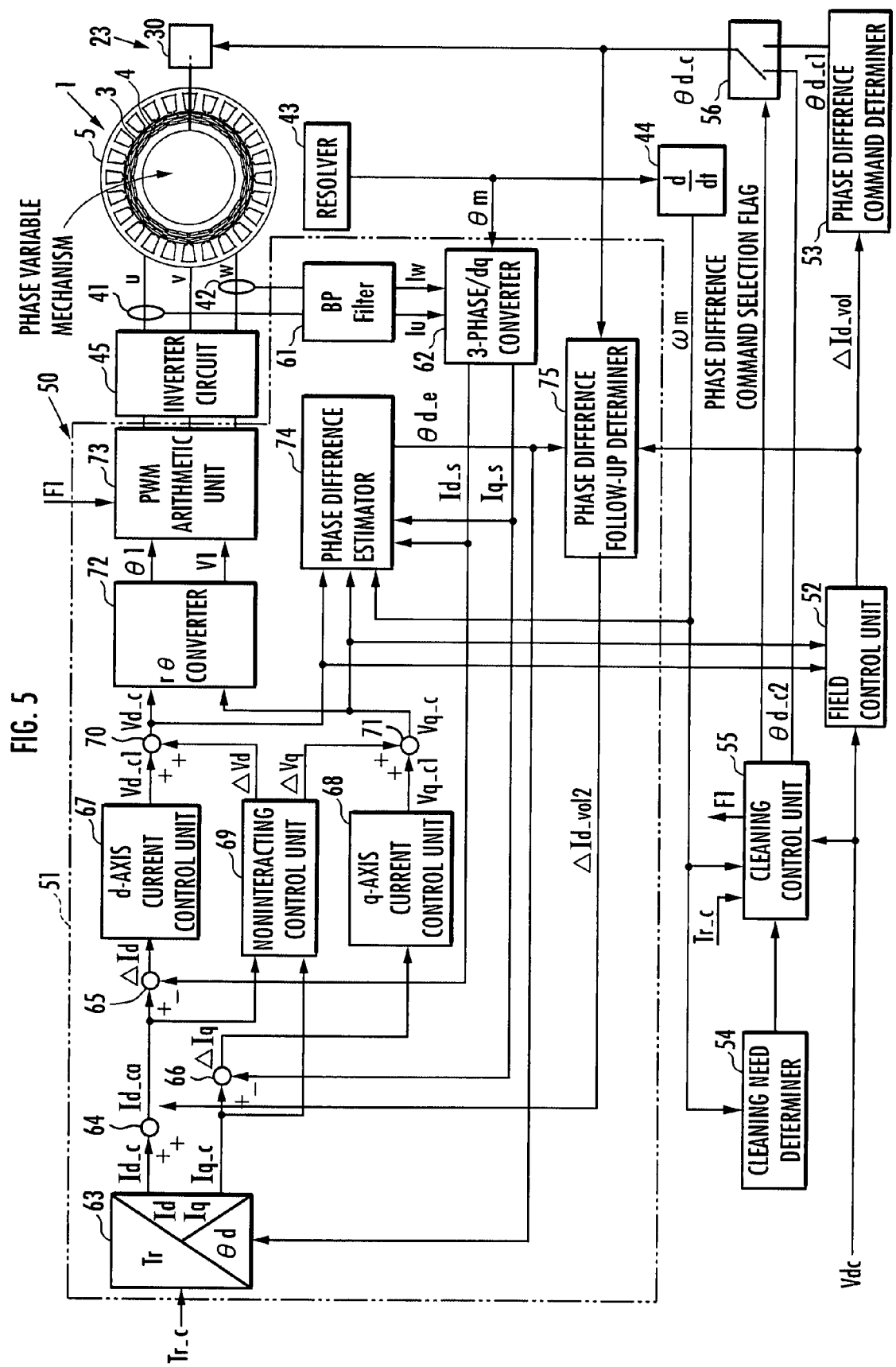
FIG. 5 is a block diagram showing a functional construction of a controller for the motor shown in FIG. 1.
Figure 6:
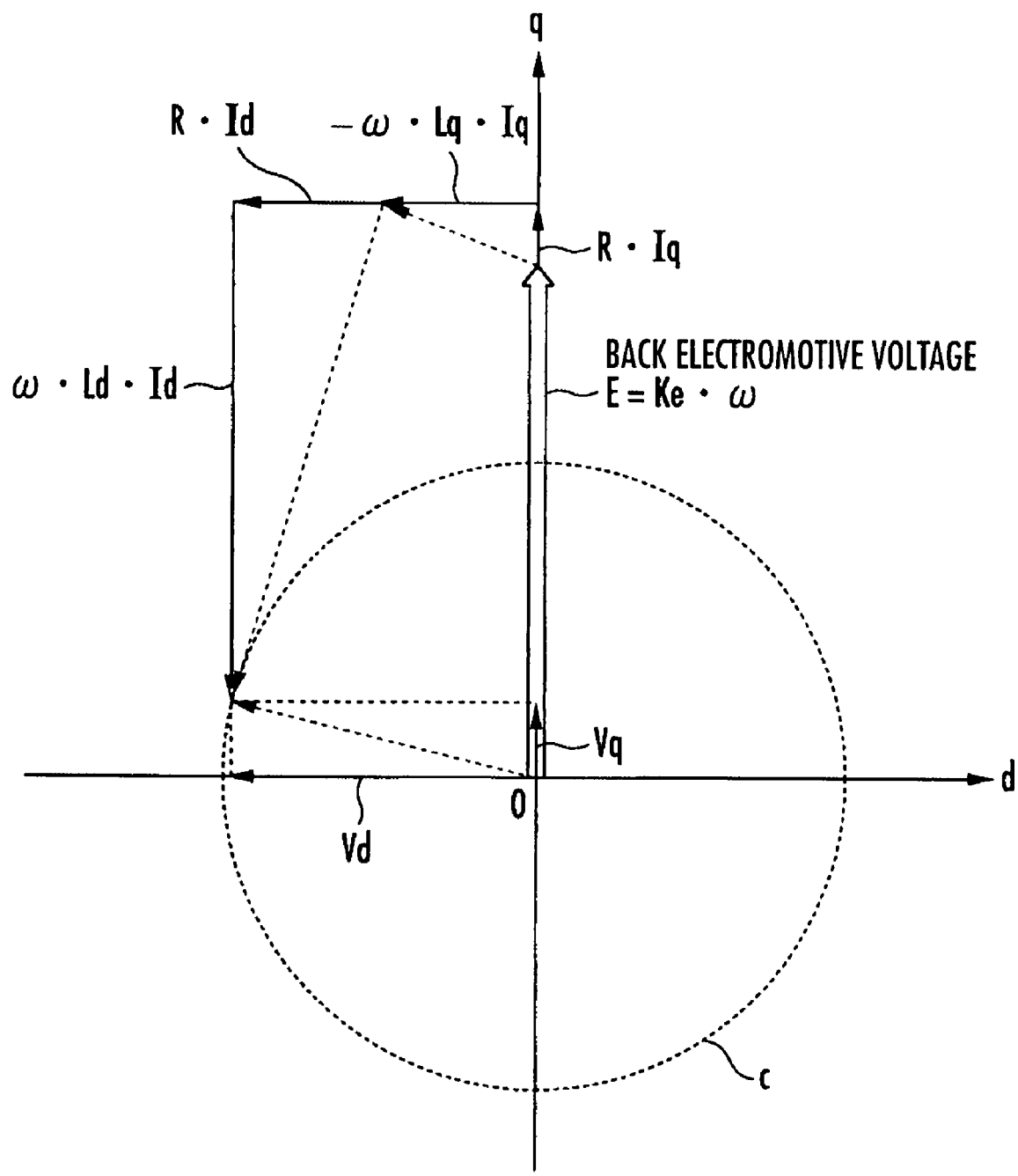
FIG. 6 is a diagram showing a relationship between current and voltage in a d-q coordinate system of the motor shown in FIG. 1.
Figure 7:
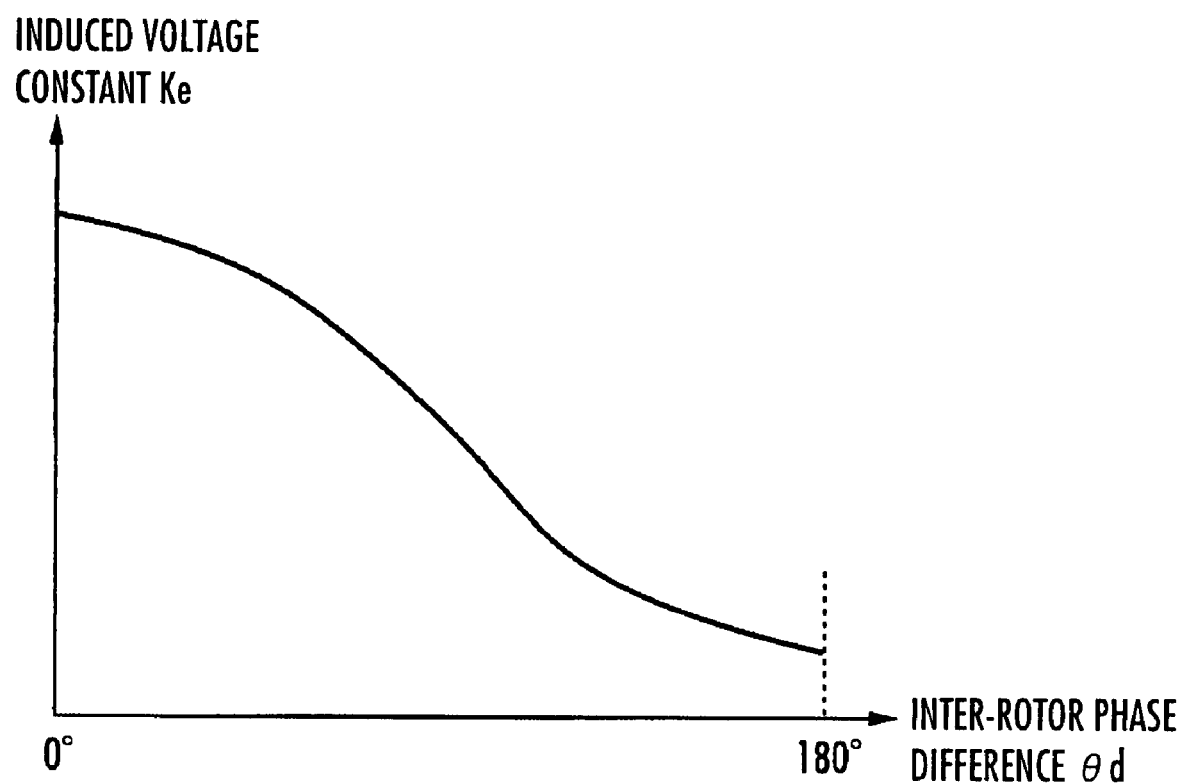
FIG. 7 is a graph showing a relationship between phase difference between the two rotors and induced voltage constant of the motor shown in FIG. 1.
Figure 8:
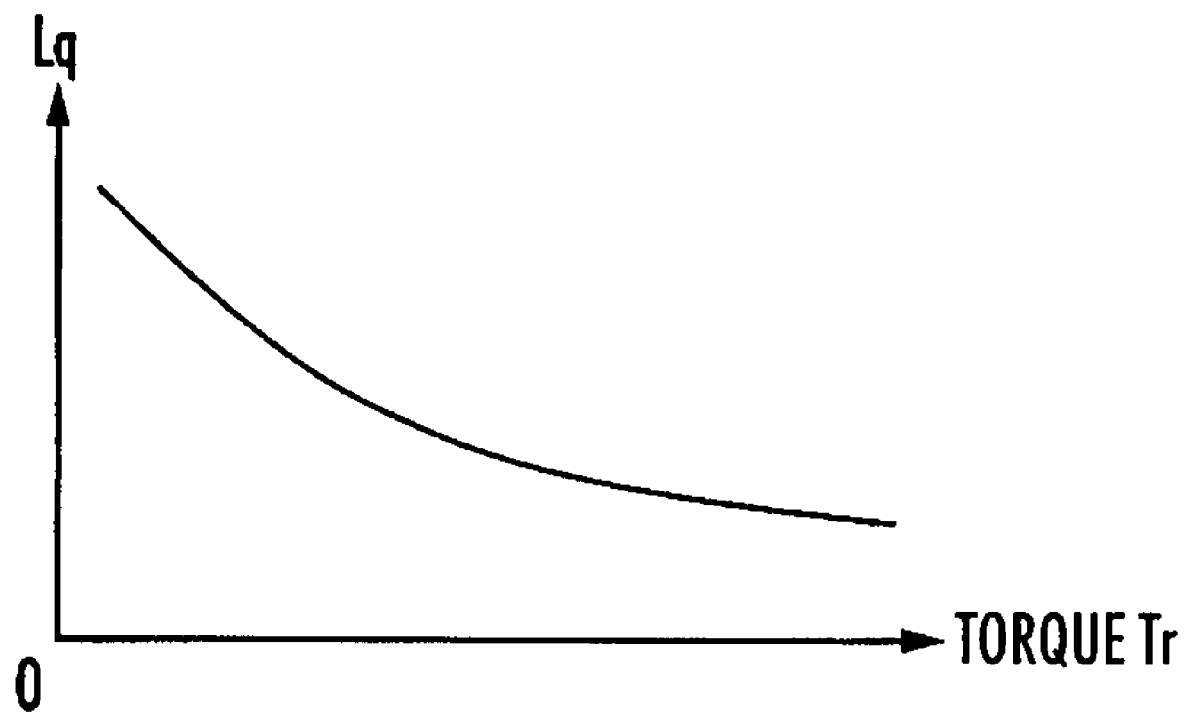
FIG. 8 is a graph showing a relationship between generated torque of an output shaft and inductance of a d-axis armature of the motor shown in FIG. 1.
Figure 9:
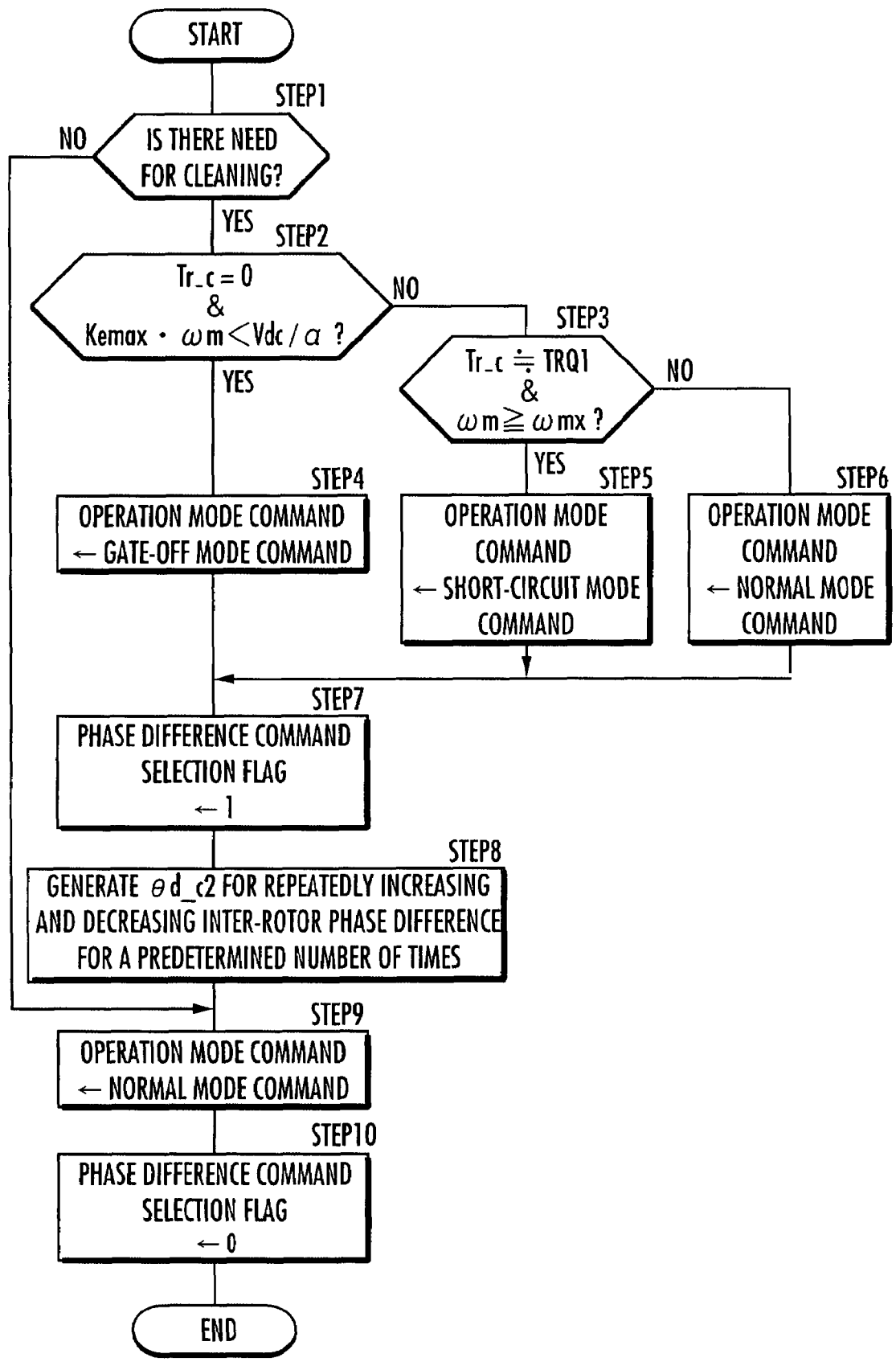
FIG. 9 is a flowchart illustrating the processing by a cleaning control unit provided in the controller showing in FIG. 5.
Figure 10:
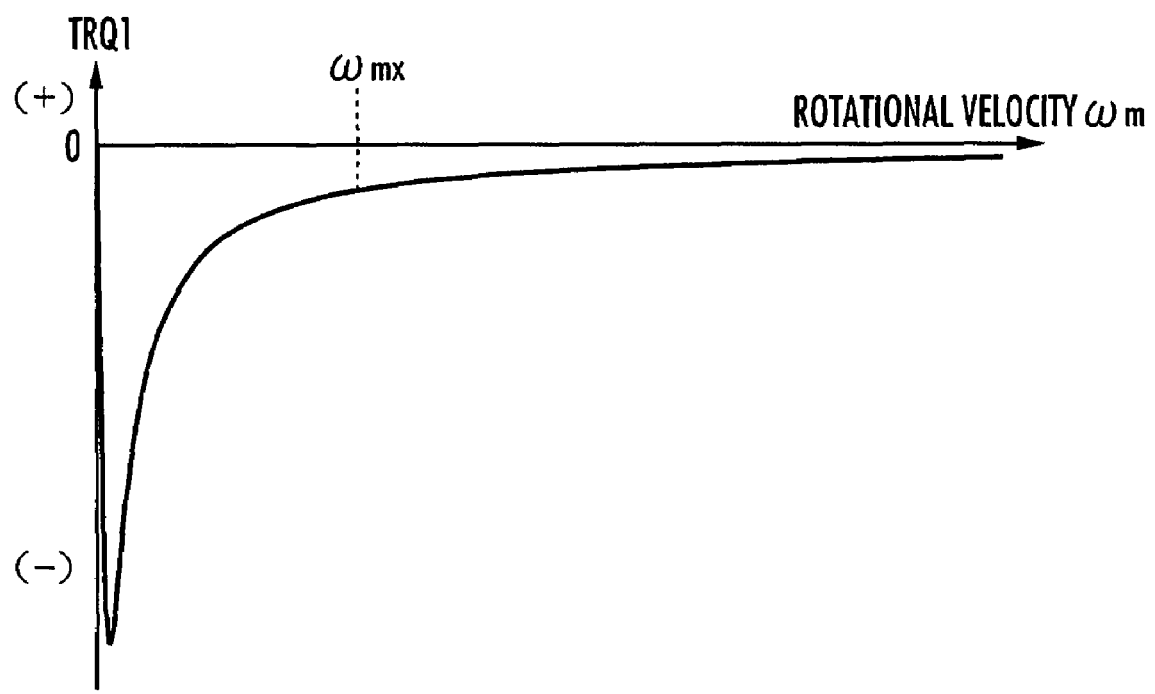
FIG. 10 is a graph for explaining the processing in STEP 3 of the flowchart shown in FIG. 9.

Referring now to FIG. 5 to FIG. 10, a controller 50 of the motor 1 in the present embodiment will be explained. FIG. 5 is a block diagram showing a functional construction of the controller 50 of the motor 1 (hereinafter referred to simply as "the controller 50"). FIGS. 6 to 8 are diagrams for explaining the processing by a phase difference estimator 74 provided in the controller 50, FIG. 9 is a flowchart which illustrates the processing by a cleaning control unit 55 provided in the controller 50, and FIG. 10 is a graph for explaining the processing in STEP3 of FIG. 9. FIG. 5 schematizes the motor 1 and expresses the mechanism constituted of the first member 9 and the second member 10 as "the phase varying mechanism."

The controller 50 in the present embodiment controls the energization of the armature of the motor 1 basically by the so-called d-q vector control. More specifically, the controller 50 handles the motor 1 by converting it into an equivalent circuit based on a d-q coordinate system, which is a two-phase DC rotary coordinate system in which d-axis indicates the direction of field and q-axis indicates a direction that is orthogonal to the d-axis. The equivalent circuit has an armature on the d-axis (hereinafter referred to as "the d-axis armature") and an armature on the q-axis (hereinafter referred to as "the q-axis armature"). The d-q coordinate system is a coordinate system fixed relative to the output shaft 2 of the motor 1. The controller 50 controls the energizing current of an armature (an armature for three phases) of the motor 1 so as to generate a torque based on a torque command value Tr_c (a command value of a torque to be generated in the output shaft 2 of the motor 1), which is supplied from outside, in the output shaft 2. In parallel to the energization control, the controller 50 controls the inter-rotor phase difference θd of the motor 1 through the intermediary of the phase difference changing driver 23.

To carry out the control, the present embodiment includes, as sensors, current sensors 41 and 42 as current detectors for detecting the currents of two phases (e.g., U-phase and W-phase) out of the three phases of an armature of the motor 1, and a resolver 43 as a rotational position detecting sensor for detecting a rotational position θm (rotational angle)(=rotational angle of the outer rotor 3) of the output shaft 2 of the motor 1.

The controller 50 is an electronic unit composed of a CPU, memories, and the like, and its control processing is sequentially carried out at a predetermined calculation processing cycle. The following will specifically explain functional means of the controller 50.

The controller 50 includes a rotational velocity calculator 44 which determines a rotational velocity ωm of the output shaft 2 of the motor 1 (=rotational velocity of the outer rotor 3) by differentiating the rotational position θm detected by the resolver 43, and an energization control unit 51 which controls the energizing current of the armature of each phase of the motor 1 through the intermediary of an inverter circuit 45. The inverter circuit 45, which is not shown since it is widely known, has an upper arm and a lower arm, each of which is provided with three switching elements, such as FETs, for three phases and reflux diodes connected in parallel to the switching elements. The energization control unit 51 corresponds to the energization controlling means in the present invention, and the inverter circuit 45 corresponds to the energization circuit in the present invention.

The energization control unit 51 includes a bandpass filter 61 which obtains current detection values Iu and Iw of the U-phase and the W-phase, respectively, of an armature of the motor 1 by removing unwanted components from output signals of the current sensors 41 and 42, and a three-phase/dq converter 62 which calculates a detection value Id_s of a current of the d-axis armature (hereinafter referred to as the d-axis current) and a detection value Iq_s of a current of the q-axis armature (hereinafter referred to as the q-axis current) on the basis of the current detection values Iu and Iw and the rotational position θm of the output shaft 2 of the motor 1 detected by the resolver 43.

The energization control unit 51 further includes a current command calculator 63 which determines a d-axis current command value Id_c, which is a command value of the d-axis current, and a q-axis current command value Iq_c, which is a command value of the q-axis current, an arithmetic unit 64 which determines a corrected d-axis current command value Id_ca obtained by correcting the d-axis current command value Id_c by adding a d-axis current correction value ΔId_vol2 (the value determined at the last calculation processing cycle) determined by a phase difference follow-up determiner 75, which will be discussed later, to the d-axis current command value Id_c, an arithmetic unit 65 which determines a difference ΔId between the corrected d-axis current command value Id_ca and the d-axis current detection value Id_s (=Id_ca−Id_s; hereinafter referred to as "the d-axis current difference ΔId), and an arithmetic unit 66 which determines a difference ΔIq between the q-axis current command value Iq_c and the q-axis current detection value Iq_s(=Iq_c−Iq_s; hereinafter referred to as "the q-axis current difference ΔIq). A d-axis current correction value ΔId_vo2 means a manipulated variable of the d-axis current for preventing the magnitude of a resultant vector of a voltage of the d-axis armature and a voltage of the q-axis armature from exceeding a predetermined supply voltage Vdc.

The current command calculator 63 receives a torque command value Tr_c (a command value of a torque to be generated in the output shaft 2 of the motor 1) supplied from outside to the controller 50 and an estimated value θd_e (a value determined at the last calculation processing cycle) of the inter-rotor phase difference θd determined by a phase difference estimator 74, which will be discussed hereinafter. Then, the current command calculator 63 determines the d-axis current command value Id_c and the q-axis current command value Iq_c on the basis of the received values according to a preset map. The d-axis current command value Id_c and the q-axis current command value Iq_c mean the feedforward values of the d-axis current and the q-axis current for generating a torque of the torque command value Tr_c in the motor 1.

The torque command value Tr_c is determined on the basis of, for example, the manipulated variable of an accelerator (the amount of depression on an accelerator (gas) pedal), or a driving velocity of a vehicle, such as a hybrid vehicle or an electric vehicle, provided with the motor 1 as a traveling motive power source. The torque command value Tr_c comes in the command value of a power running torque and the command value of a regenerative torque. In the present embodiment, the torque command value Tr_c of a power running torque takes a positive value, while the torque command value Tr_c of a regenerative torque takes a negative value.

The energization control unit 51 further includes a d-axis current control unit 67 which determines a d-axis voltage basic command value Vd_c1 (the basic value of a voltage command value of the d-axis armature) according to a feedback control law, such as a PI law, on the basis of the d-axis current difference ΔId so as to converge the ΔId to zero, a q-axis current control unit 68 which determines a q-axis voltage basic command value Vq_c1 (the basic value of a voltage command value of the q-axis armature) according to a feedback control law, such as a PI law, on the basis of the q-axis current difference ΔIq so as to converge the ΔIq to zero, a noninteracting control unit 69 which determines noninteracting components ΔVd, ΔVq (ΔVd: d-axis noninteracting component; ΔVq: q-axis noninteracting component) for canceling the influences of speed electromotive forces, which interfere with each other between the d-axis and the q-axis, on the basis of the corrected d-axis current command value Id_ca and q-axis current command value Iq_c, an arithmetic unit 70 which determines a final d-axis voltage command value Vd_c by adding the noninteracting component ΔVd to the d-axis voltage basic command value Vd_c1 (by correcting Vd_c1 with ΔVd), and an arithmetic unit 71 which determines a final q-axis voltage command value Vq_c by adding the noninteracting component ΔVq to the q-axis voltage basic command value Vd_c1 (by correcting Vq_c1 with ΔVq).

Further, the energization control unit 51 includes an rθ converter 72 which converts a vector having the d-axis voltage command value Vd_c and the q-axis voltage command value Vq_c as its components into a component of a magnitude V1 and a component of an angle θ1 thereof, and a PWM arithmetic unit 73 which converts the components of the magnitude V1 and the angle θ1 into a three-phase AC voltage and energizes the armature of each phase of the motor through the intermediary of the inverter circuit 45 by PWM control on the basis of the three-phase AC voltage. In this case, the PWM arithmetic unit 73 energizes the armature of each phase by controlling the turning ON/OFF of the switching elements (not shown) of the inverter circuit 45. Although not shown in FIG. 5, the PWM arithmetic unit 73 receives the rotational position θm of the output shaft 2 detected by the resolver 43 in order to convert the aforesaid V1 and θ1 into an AC voltage of the armature of each phase of the motor 1.

The PWM arithmetic unit 73 also receives an operation mode command F1, which defines the control modes of the switching elements of the inverter circuit 45, from a cleaning control unit 55 to be discussed later.

In the present embodiment, the operation mode command F1 comes in a short-circuit mode command, a gate-off mode command, and a normal mode command. The short-circuit mode command is a command of an operation mode for turning ON all switching elements of at least one of the upper arm and the lower arm of the inverter circuit 45 to short-circuit the armatures of the phases of the motor 1. The gate-off mode command is a command of an operation mode for turning OFF all switching elements of the inverter circuit 45 to cut off the energization of the armatures of the phases of the motor 1. The normal mode command is a command of a d-q vector control mode for operating the switching elements of the inverter circuit 45 on the basis of a three-phase AC voltage obtained by converting the aforesaid V1 and θ1 (on the basis of a set of the d-axis voltage command value Vd_c and the q-axis voltage command value Vq_c). The PWM arithmetic unit 73 controls the turning ON/OFF of the switching elements of the inverter circuit 45 according to a received operation mode command. In this case, if the short-circuit mode command or the gate-off mode command has been input to the PWM arithmetic unit 73, then the turning ON/OFF of the switching elements of the inverter circuit 45 will be controlled without depending on the set of the d-axis voltage command value Vd_c and the q-axis voltage command value Vq_c.

If the operation mode command F1 is the normal mode command, then the energizing current of the armature of each phase of the motor 1 will be controlled such that a torque of the torque command value Tr_c is generated in the output shaft 2 of the motor 1 by the processing function of the energization control unit 51.

The energization control unit 51 further includes a phase difference estimator 74 which estimates the inter-rotor phase difference θd of the motor 1 and a phase difference follow-up determiner 75 which determines the d-axis current correction value ΔId_vol_2.

According to the present embodiment, the phase difference estimator 74 estimates the inter-rotor phase difference θd of the motor 1 as follows.

FIG. 6 is a diagram illustrating the relationship between current and voltage in the d-q coordinate system, the axis of ordinates indicating the q-axis (torque axis) and the axis of abscissas indicating the d-axis (field axis).

In FIG. 6, Ke denotes an induced voltage constant of the motor 1, ω denotes a rotational velocity (angular velocity) of the output shaft 2 of the motor 1, R denotes resistance values of the d-axis armature and the q-axis armature, Ld denotes an inductance of the d-axis armature, Lq denotes an inductance of the q-axis armature, Id denotes a d-axis current, Iq denotes a q-axis current, Vd denotes a d-axis voltage, and Vq denotes a q-axis voltage. C denotes a voltage circle having the supply voltage Vdc (target value) of the motor 1 as its radius.

As shown in the figure, the following relational expressions (1) and (2) hold between Vd, Vq and Id, Iq.

$$Ke \cdot \omega + R \cdot Iq = Vq - \omega \cdot Ld \cdot Id \tag{1}$$

$$Vd = R \cdot Id - \omega \cdot Lq \cdot Iq \tag{2}$$

The induced voltage constant Ke of the motor 1 has a notable correlation with the intensity of a resultant field (the intensity of a magnetic flux) of the permanent magnets 6 of the outer rotor 3 and the permanent magnets 8 of the inner rotor 4. In this case, the intensity of the resultant field depends on the inter-rotor phase difference θd, so that the induced voltage constant Ke has a notable correlation with the inter-rotor phase difference θd. In the present embodiment, there is a correlation, as shown by the graph shown in FIG. 7, between the induced voltage constant Ke of the motor 1 and the inter-rotor phase difference θd. More specifically, as the inter-rotor phase difference θd increases from 0[deg] to 180[deg], i.e., as the intensity of the resultant field decreases from a maximum level to a minimum level, the value of the induced voltage constant Ke monotonously decreases.

In the present embodiment, therefore, the phase difference estimator 74 determines the induced voltage constant Ke according to the following expression (3) derived from expression (1) given above. Then, from this induced voltage constant Ke, an estimated value θd_e of the inter-rotor phase difference θd is determined on the basis of a preset data table, as shown by the graph of FIG. 7.

$$Ke = (Vq - \omega \cdot Ld \cdot Id - R \cdot Iq)/\omega \tag{3}$$

In this case, the q-axis voltage command value Vq_c calculated by the arithmetic unit 71 and the d-axis current detection value Id_s and the q-axis current detection value Iq_s determined by the three-phase/dq converter 62 are used as the values of Vq, Id, and Iq required for the calculation of expression (3). As the value for Ld, a fixed value determined beforehand is used. As the value of R, a value determined according to, for example, the following expression (4) derived from expression (2) given above is used.

$$R = (Vd + \omega \cdot Lq \cdot Iq)/Id \tag{4}$$

As the values of Vd, Iq, and ω required for the calculation of this expression (4), the d-axis voltage command value Vd calculated by the arithmetic unit 70, the q-axis current detection value Iq_s calculated by the three-phase/dq converter 62, and the rotational velocity ωm calculated by the rotational velocity calculator 75 may be used. Further, from the torque command value Tr_c, the value of Lq is determined on the basis of a data table prepared beforehand, as shown by the graph of FIG. 8, then the determined value is used for the calculation of expression (4) in the present embodiment. The graph shown in FIG. 8 illustrates the correlation between the torques generated in the output shaft 2 of the motor 1 and the values of Lq. As illustrated, a notable correlation exists between the torques generated in the motor 1 and Ld. According to the present embodiment, therefore, the correlation is used to determine the value of Ld from the torque command value Tr_c, as described above.

When determining the value of R according to expression (4), if the d-axis current Id takes a value in the vicinity of zero, then the value of R cannot be accurately determined. As a solution thereof, the value of R may be determined, for example, as follows. In a situation wherein the d-axis current command value Id_ca calculated by the arithmetic unit 64 is maintained at a value in the vicinity of zero, the d-axis current command value is reset such that it periodically switches between a positive value and a negative value in the vicinity of zero and a temporal mean value thereof is maintained in the vicinity of zero. Then, in this state, the value of R is calculated according to the following expression (5).

$$R=\{(Vd1-Vd2)+\omega \cdot Lq \cdot (Iq1-Iq2)\}/(Id1-Id2) \quad (5)$$

where Vd1, Iq1, and Id1 mean a d-axis voltage, a q-axis current, and a d-axis current, respectively, which are associated with time at which the d-axis current command value takes a positive value or a negative value (hereinafter referred to as time 1), and Vd2, Iq2, and Id2 mean a d-axis voltage, a q-axis current, and a d-axis current, respectively, which are associated with time at which the d-axis current command value takes reverse polarity from the case of Vd1, Iq1, and Id1 (hereinafter referred to as time 2). For the values, the d-axis voltage command value Vd_c, the q-axis current detection value Iq_s, and the d-axis current detection value Id_s at time 1 and time 2 may be used. Further, changes in an actual rotational velocity of the output shaft 2 of the motor 1 and an actual inductance of the q-axis armature in one cycle during which the d-axis current command value is changed are regarded to be substantially zero, and the value of the rotational velocity ωm calculated by the rotational velocity calculator 44 at time 1 or time 2 may be used as the value of ω in expression (5). Further, the value determined from the torque command value Tr_c at time 1 or time 2 on the basis of the data table shown by the graph of FIG. 8 may be used as the value of Lq in expression (5).

Determining the value of R as described above makes it possible to properly determine the value of R even in the situation wherein the d-axis current Id takes a value in the vicinity of zero.

Supplementally, to estimate the value of the induced voltage constant Ke according to the above expression (3) the value of R may take a fixed value set beforehand. Further, to estimate the inter-rotor phase difference θd, the value of Lq may be considered in addition to the value of Ke so as to enhance the accuracy of the estimation. For instance, the estimated value θd_e of the inter-rotor phase difference θd may be determined on the basis of a preset map from the value of Ke determined according to expression (3) and the value of Lq determined on the basis of the data table shown in FIG. 8. The value of R and the value of Lq are subject to influences of the temperatures of the armatures of the motor 1 or the permanent magnets 6 and 8, so that the temperatures may be detected or estimated thereby to estimate the values of R and Lq on the basis of the temperatures. Then, by using the estimated value of R or Lq, the value of Ke or the inter-rotor phase difference θd may be estimated, as described above.

The processing by the phase difference follow-up determiner 75 will be discussed in detail hereinafter.

The controller 50 includes, in addition to the rotational velocity calculator 44 and the energization control unit 51, a field control unit 52 which determines a field manipulating current ΔId_vol as the manipulated variable of a field for preventing the magnitude of the resultant vector (resultant voltage) of the d-axis voltage command value Vd_c and the q-axis voltage command value Vq_c from exceeding the supply voltage Vdc (target value) of the motor 1 supplied to the controller 50, a phase difference command determiner 53 that determines a first phase difference command value θd_c1, which is the first command value of the inter-rotor phase difference θd of the motor 1, on the basis of the field manipulating current ΔId_vol, a cleaning need determiner 54 that determines whether it is necessary to clean the hydraulic chambers 24 and 25 of the phase difference changing driver 23, the cleaning control unit 55 that carries out processing for determining the operation mode command F1 or determining a second phase difference command value θd_c2, which is a second command value of the inter-rotor phase difference θd, on the basis of a determination result given by the cleaning need determiner 54, and a phase difference command selector 56 that selects one of the first phase difference command value θd_c1 and the second phase difference command value θd_c2 as a phase difference command value θd_c, and outputs the selected phase difference command value θd_c to the hydraulic source unit 30 of the phase difference changing driver 23. The cleaning need determiner 54 corresponds to the cleaning need determining means in the present invention, and the cleaning control unit 55 corresponds to the cleaning phase difference controlling means in the present invention.

In order to determine the field manipulating current ΔId_vol, the field control unit 52 sequentially receives the supply voltage Vdc (target value) of the motor 1 supplied to the controller 50 and the d-axis voltage command value Vd_c and the q-axis voltage command value Vd_q determined in the energization control unit 51. Then, based on the difference between the magnitude of a resultant vector of the received Vd_c and Vd_q $(=\sqrt{Vd\_c^2+Vd\_q^2})$ and the supply voltage Vdc, the field control unit 52 carries out a feedback control law to bring the difference close to zero, thereby determining the field manipulating current ΔId_vol. The supply voltage Vdc is set on the basis of mainly a detection value of an output voltage of a storage battery (not shown) serving as the power source of the motor 1.

There are two methods available to make the magnitude of the resultant vector of Vd_c and Vd_q coincide with the supply voltage Vdc, i.e., to make the resultant vector trace the circumference of the voltage circle shown in FIG. 6. According to one method, the d-axis current is adjusted so as to manipulate the fields between the rotors 3 and 4 and the armatures in a pseudo manner. According to the other method, the inter-rotor phase difference θd is adjusted to consequently adjust the induced voltage constant Ke, thereby directly manipulating the resultant field of the permanent magnets 6 and 8. The field manipulating current ΔId_vol indicates the manipulated variables of the fields in terms of the manipulated variables of the d-axis current.

The field control unit 52 may alternatively determine the manipulated variable of the inter-rotor phase difference θd or the induced voltage constant Ke in place of the field manipulating current ΔId_vol.

The field manipulating current ΔId_vol determined by the field control unit 52 as described above is input to the phase difference command determiner 53. The phase difference command determiner 53 then converts the field manipulating current ΔId_vol into a manipulated variable (correction amount) of the inter-rotor phase difference θd that causes a field change equivalent to a field change that would result if the d-axis current were manipulated by the field manipulating current ΔId_vol, and corrects the current first phase difference command value θd_c1 by using the manipulated variable of the inter-rotor phase difference θd so as to determine a new first phase difference command value θd_c1. In this case, Id_vol is converted into the manipulated variable of the inter-rotor phase difference θd by multiplying Id_vol by a gain set on the basis of, for example, the current first phase difference command value θd_c1.

In the present embodiment, the cleaning need determiner 54 determines the need for cleaning the hydraulic chambers 24 and 25, i.e., removing the sludge accumulating in the hydraulic chambers 24 and 25, on the basis of the rotational velocity ωm of the output shaft 2 of the motor 1 calculated by the rotational velocity calculator 44. The amount of sludge building up per unit time in the hydraulic chambers 24 and 25 is approximately proportional to the square of the rotational velocity ωm of the output shaft 2 of the motor 1. According to the present embodiment, therefore, the cleaning need determiner 54 cumulatively adds a squared value ωm² (or a value that is proportional to ωm²) of the rotational velocity ωm at each calculation processing cycle. When the cumulatively added value Σωm² exceeds a predetermined value set beforehand, it is determined that the hydraulic chambers 24 and 25 need to be cleaned and supplies the determination result to the cleaning control unit 55.

The cumulatively added value Σωm² is stored and retained in a nonvolatile memory, such as an EEPROM, so that it is not lost during a halt of drive of the vehicle. The cumulatively added value Σωm² is initialized to zero after completion of the cleaning operation, which will be described later.

Supplementally, in the present embodiment, the cumulatively added value Σωm² has been used to determine the need for cleaning. Alternatively, however, for example, the time for which the output shaft 2 of the motor 1 rotates may be measured and when the measured time exceeds a predetermined value, then it may be determined that the cleaning is necessary. As another alternative, for example, the need for the cleaning may be determined on the basis of both the measured time and the cumulatively added value Σωm².

The cleaning control unit 55 receives the rotational velocity ωm calculated by the rotational velocity calculator 44, the torque command value Tr_c, and the value of the supply voltage Vdc of the motor 1. Then, the cleaning control unit 55 determines the operating condition of the motor 1 on the basis of the received values, determines the operation mode command F1 accordingly, and outputs the determined operation mode command F1 to the PWM arithmetic unit 73 of the energization control unit 51, the details of which will be discussed later. The cleaning control unit 55 also determines the second phase difference command value θd_c2 as the command value of the inter-rotor phase difference θd to clean the hydraulic chambers 24 and 25, and outputs the second phase difference command value θd_c2 to the phase difference command selector 56. Moreover, the cleaning control unit 55 sets the value of a phase difference command selection flag that specifies which of the first phase difference command value θd_c1 and the second phase difference command value θd_c2 should be selected by the phase difference command selector 56, and outputs the set value to the phase difference command selector 56.

In the present embodiment, if the value of the phase difference command selection flag is 0, then it means that the first phase difference command value θd_c1 determined by the phase difference command determiner 53 should be selected, and if the value is 1, then it means that the second phase difference command value θd_c2 determined by the cleaning control unit 55 should be selected.

The phase difference command selector 56 selects either the first phase difference command value θd_c1 or the second phase difference command value θd_c2 on the basis of the value of the phase difference command selection flag, and outputs the selected value as the phase difference command value θd_c to the hydraulic source unit 30 of the phase difference changing driver 23.

The hydraulic source unit 30 manipulates the hydraulic pressures in the hydraulic chambers 24 and 25 to cause an actual inter-rotor phase difference θd to follow a received phase difference command value θd_c. In this case, for example, the hydraulic pressures in the hydraulic chambers 24 and 25 (hydraulic pressures that cause a torque generated between the first member 9 and the second member 10 by the difference in hydraulic pressure between the adjoining hydraulic chambers 24 and 25 to balance out the aforesaid magnetic force torque) are determined from the phase difference command value θd_c on the basis of a preset data table, and the hydraulic pressures of the hydraulic chambers 24 and 25 are controlled to the determined hydraulic pressures thereby to make the inter-rotor phase difference θd follow the phase difference command value θd_c.

The processing by the phase difference follow-up determiner 75 of the energization control unit 51 will now be explained. According to the present embodiment, in order to set the magnitude of the resultant vector of the d-axis voltage command value Vd_c and the q-axis voltage command value Vq_c to the supply voltage Vdc (target value), basically, the inter-rotor phase difference θd is adjusted thereby to manipulate a resultant field of the permanent magnets 6 and 8. In this case, an actual inter-rotor phase difference θd generally delays in following the phase difference command value θd_c, so that the d-axis current is adjusted if the phase difference command value θd_c and the inter-rotor phase difference θd_e estimated by the phase difference estimator 74 do not agree with each other. In the situation wherein the phase difference command value θd_c and the inter-rotor phase difference θd_e estimated by the phase difference estimator 74 do not agree with each other as described above, the phase difference follow-up determiner 75 determines the d-axis current correction value ΔId_vol_2 to adjust the d-axis current.

To carry out the processing, the phase difference follow-up determiner 75 sequentially receives the inter-rotor phase difference θd_e estimated by the phase difference estimator 74, the phase difference command value θd_c selected by the phase difference command selector 56, and the field manipulating current ΔId_vol determined by the field control unit 52.

The phase difference follow-up determiner 75 sets the value of the d-axis current correction value ΔId_vol2 to zero if the received estimated value θd_e of the inter-rotor phase difference θd coincides with the phase difference command value θd_c, or it directly sets the field manipulating current ΔId_vol as the d-axis current correction value ΔId_vol2 if the received estimated value θd_e of the inter-rotor phase difference θd does not coincide with the phase difference command value θd_c. The d-axis current correction value ΔId_vol2 set as described above is supplied to the arithmetic unit 64.

Now, the processing by the cleaning control unit 55 and an operation of cleaning the hydraulic chambers 24 and 25 thereby will be explained with reference to FIG. 9 and FIG. 10.

As shown by the flowchart of FIG. 9, the cleaning control unit 55 first determines whether there is a need for cleaning or removing sludge from the hydraulic chambers 24 and 25

(STEP1). In this case, the cleaning control unit 55 determines that there is a need for cleaning if a determination result given by the cleaning need determiner 54 indicates the need for cleaning. If a determination result given by the cleaning need determiner 54 indicates no need for cleaning, then the cleaning control unit 55 determines that there is no need for cleaning. The processing by the cleaning need determiner 54 may alternatively be performed by the cleaning control unit 55.

If the determination result in STEP1 is negative, that is, there is no need for cleaning, then the cleaning control unit 55 sets the operation mode command to the normal mode command in STEP9 and also sets the value of the phase difference command selection flag to 0 in STEP10. The set operation mode command is output to the PWM arithmetic unit 73 of the energization unit 51 and the value of the phase difference command selection flag is output to the phase difference command selector 56.

Thus, if there is no need for cleaning, then the PWM arithmetic unit 73 turns ON/OFF the switching elements of the inverter circuit 45 on the basis of the d-axis voltage command value Vd_c and the q-axis voltage command value Vq_c. This controls the energizing current supplied to the armatures of the motor 1 to the current based on the torque command value Tc_r (the current that causes the d-axis current and the q-axis current to follow the corrected d-axis current command value Id_ca and the corrected q-axis current command value Iq_c, respectively) by the d-q vector control. As a result, a torque of the torque command value Tr_c is generated in the output shaft 2 of the motor 1.

The phase difference command selector 56 selects, as the phase difference command value θd_c, the first phase difference command value θd_c1 input from the phase difference command determiner 53, and outputs the selected phase difference command value θd_c to the hydraulic source unit 30 of the phase difference changing driver 23. Thus, the hydraulic source unit 30 manipulates the hydraulic pressures in the hydraulic chambers 24 and 25 such that the actual inter-rotor phase difference θd becomes the first phase difference command value θd_c1.

At this time, the first phase difference command value θd_c1 is maintained to be substantially constant, and the d-axis current correction value ΔId_vol2 is maintained at zero by the processing implemented by the phase difference follow-up determiner 75 in a state wherein the estimated value θd_e of the inter-rotor phase difference θd determined by the phase difference estimator 74 steadily agrees with θd_c1. If the first phase difference command value θd_c1 changes with a consequent difference from the estimated value θd_e of the inter-rotor phase difference θd, then the d-axis current correction value ΔId_vol2 is set to the field manipulating current ΔId_vol determined by the field control unit 52 so as to compensate for an excess or a deficiency of the field attributable to the difference by the field produced by the d-axis current.

If the determination result in STEP1 is affirmative, that is, if there is a need for cleaning, then the cleaning control unit 52 determines whether the motor 1 is in a state wherein the torque command value Tr_c is zero and the product of the rotational velocity ωm of the output shaft 2 of the motor 1 (ωm calculated by the rotational velocity calculator 44) and a maximum induced voltage constant Kemax, which is a value of an induced voltage constant in the maximum field state of the motor 1 (=Kemax·ωm) is smaller than the value obtained by dividing the supply voltage Vdc by a predetermined value α (=Vdc/α)(STEP2). The predetermined value α, which denotes a modulation factor of the motor 1, is $\sqrt{6}$ in the present embodiment. Whether Kemax·ωm<Vdc/α is equivalent to whether ωm is smaller than a predetermined value (Vdc/(α·Kemax)).

In a situation wherein the determination result in STEP2 is affirmative means Tr_c=0, so that the energizing current to each phase of the armature is being controlled such that the torque generated in the output shaft 2 of the motor 1 becomes zero. In this situation, the energizing current to the armature is maintained to be substantially zero. Under this condition, the operation of the motor 1 is not affected even if all the switching elements of the inverter circuit 45 are turned OFF. In other words, the operating state of the motor under the condition wherein the determination result in STEP2 is affirmative is equivalent to the operating state of the motor 1 in the case where all the switching elements of the inverter circuit 45 are OFF. In a situation wherein Kemax·ωm≧Vdc/α even if Tr_c=0, if all the switching elements of the upper arm or the lower arm of the inverter circuit 45, then a current that generates regenerative torque in the motor 1 inconveniently flows due to the influences of the reflux diodes of the inverter circuit 45. For this reason, the condition of whether Kemax·ωm<Vdc/α is added in STEP2.

Hence, according to the present embodiment, if the determination result in STEP2 is affirmative, then the cleaning control unit 55 sets the operation mode command to the gate-off mode command (STEP4). Further, the cleaning control unit 55 sets the phase difference command selection flag to 1 in STEP7, then generates the second phase difference command value θd_c2 to repeat increasing and decreasing the inter-rotor phase difference θd (more specifically, increasing or decreasing the inter-rotor phase difference θd and then decreasing or increasing the inter-rotor phase difference θd) for a predetermined number of times (STEP8). For example, the second phase difference command value θd_c2 is generated for a predetermined number of cycles such that it changes in a triangular waveform or a sinusoidal waveform. Repeatedly increasing and decreasing the inter-rotor phase difference θd is equivalent to repeatedly relatively rotating the inner rotor 4 with respect to the outer rotor 3 in the forward direction and the reverse direction alternately.

In this case, an upper limit value and a lower limit value in increasing and decreasing the inter-rotor phase difference θd may be values set beforehand (e.g., 180[deg] and 0[deg]), or they may be determined on the basis of the estimated value θd_e of the inter-rotor phase difference θd immediately before starting the increasing and decreasing of the inter-rotor phase difference θd. The cycle of the increasing and decreasing of the inter-rotor phase difference θd may be set to a value fixed beforehand or it may be determined on the basis of a traveling condition of a vehicle or the like.

The PWM arithmetic unit 73 of the energization control unit 51 turns OFF all the switching elements of the inverter circuit 45 by the processing in STEPs 4, 7, and 8 explained above. This cuts off the energizing current to the armatures of the motor 1, thus maintaining the torque generated in the output shaft 2 at zero, which is equivalent to the torque command value Tr_c.

Further, setting the value of the phase difference command selection flag to 1 causes the phase difference command selector 56 to select, as the phase difference command value θd_c, the second phase difference command value θd_c2 generated as described above by the cleaning control unit 55 and to output the selected second phase difference command value θd_c2 to the hydraulic source unit 30. Then, the hydraulic source unit 30 controls the hydraulic pressures in the hydraulic chambers 24 and 25 such that the actual inter-rotor phase difference θd is repeatedly increased/decreased for a predetermined number of times on the basis of the second phase difference command value θd_c2. Thus, the volumes of the hydraulic chambers 24 and 25 are repeatedly increased/decreased, causing a hydraulic oil to flow between the hydraulic chambers 24 and 25 and the exterior thereof. This moves the sludge accumulated in the hydraulic chambers 24 and 25 out from the hydraulic chambers 24 and 25, solving the problem of the accumulation of the sludge. In this case, all the switching elements of the inverter circuit 45 are turned OFF, so that the energizing current to the armatures of the motor 1 is not affected by the increasing and decreasing of the inter-rotor phase difference θd (the increasing and decreasing of a resultant field), making it possible to stably maintain the torque generated in the output shaft 2 of the motor 1 at zero.

After repeatedly increasing and decreasing the inter-rotor phase difference θd for a predetermined number of times as described above, the cleaning control unit 55 sets the operation mode command back to the normal mode command in STEP9, and further resets the value of the phase difference command selection flag to zero in STEP10. This finishes the cleaning operation of the hydraulic chambers 24 and 25.

Supplementally, the determination processing in STEP2 described above corresponds to the first operation state determining means in the present invention.

If the determination result in STEP2 is negative, then the cleaning control unit 55 determines whether the motor 1 is in an operation state wherein the torque command value Tr_c is substantially equal to a predetermined value TRQ1, which is determined as described later, (the absolute value of a difference between Tr_c and TRQ1 is a predetermined value or less in the vicinity of zero), and the rotational velocity ωm of the output shaft 2 of the motor 1 is a predetermined value ωmx or more (STEP3).

The aforesaid predetermined value TRQ1 related to torque means the value of torque generated in the output shaft 2 of the motor 1 with all the switching elements of either the upper arm or the lower arm or both arms of the inverter circuit 45 turned ON and the armature of each phase of the motor 1 short-circuited. Hereinafter, the predetermined value TRQ1 will be referred to as the short-circuit torque value TRQ1.

The short-circuit torque value TRQ1 is generally given by the following expression (6).

$$TRQ1 = 3 \cdot \frac{-R \cdot \omega e \cdot Ke}{R^2 + \omega e^2 \cdot Ld \cdot Lq} \cdot \left[ Ke + (Ld - Lq) \cdot \left( \frac{-Lq \cdot \omega e^2 \cdot Ke}{R^2 + \omega e^2 \cdot Ld \cdot Lq} \right) \right] \quad (6)$$

ωe on the right side of expression (6) denotes an electrical angular velocity of the output shaft 2 of the motor 1, and it takes a value that is proportional to a rotational velocity ωm calculated by the rotational velocity calculator 44 (a value obtained by multiplying ωm by the number of pairs of poles of the rotors 3 and 4). The meanings of other variables R, Ld, and Lq of the right side of expression (6) are as have been explained with respect to the processing of the phase difference estimator 74.

FIG. 10 is a graph showing the relationship between a short-circuit torque value TRQ1 given by the expression (6) and the rotational velocity ωm. As illustrated, the short-circuit torque value TRQ1 takes a negative torque, that is, a regenerative torque, and the value thereof becomes an approximately constant value when the rotational velocity ωm reaches a predetermined value ωmx or more (proportional to ωm or a reciprocal of ωe, to be more accurate).

In the present embodiment, the short-circuit torque value TRQ1 to be compared with the torque command value Tr_c in STEP3 is determined according to the above expression (6). In this case, as the values of Ld and Lq required for the calculation of the right side of expression (6), the values which are used, for example, in the processing by the phase difference estimator 74 at the time when the determination result in STEP1 turns to YES may be directly used as they are. As the values of R and Ke, the values estimated in the processing by the phase difference estimator 74 at the time when the determination result in STEP1 turns to YES may be used. If, however, the rotational velocity ωm is in a high-velocity range of the predetermined value ωmx or more, a change in the short-circuit torque value TRQ1 in response to changes in Ld, Lq, R, and Ke is sufficiently small. Therefore, preset fixed values may be used as the values of Ld, Lq, R, and Ke in the calculation of expression (6).

Supplementally, the relationship between the short-circuit torque value TRQ1 and the rotational velocity ωm when the rotational velocity ωm is the predetermined value ωmx or more may be defined beforehand in the form of a data table, and the short-circuit torque value TRQ1 may be determined from the rotational velocity ωm (a value calculated by the rotational velocity calculator 44) on the basis of the data table.

In the situation wherein the determination result in STEP3 is affirmative, the operating condition of the motor 1 is not affected even if all the switching elements of either the upper arm or the lower arm or both of the arms of the inverter circuit 45 are turned ON and the armature of each phase of the motor 1 is short-circuited. This means that the operating condition of the motor 1 in the situation wherein the determination result of STEP3 is affirmative is equivalent to the operating condition of the motor 1 when the armature of each phase of the motor 1 is short-circuited.

According to the present embodiment, therefore, if the determination result of STEP3 is affirmative, the cleaning control unit 55 sets the operation mode command to the short-circuit mode command (STEP5). Further, the cleaning control unit 55 sets the phase difference command selection flag to 1 in STEP7, then generates the second phase difference command value θd_c2 such that the inter-rotor phase difference θd is repeatedly increased/decreased for a predetermined number of times (STEP8). The processing in STEP8 is carried out in the same manner as that for setting the operation mode command to the gate-off mode command.

The processing in STEPs 5, 7, and 8 explained above causes the PWM arithmetic unit 73 of the energization control unit 51 to turn on all the switching elements of the upper arm unit 51 or the lower arm of the inverter circuit 45. This short-circuits the armature of each phase of the motor 1 and the torque generated in the output shaft 2 is maintained at the short-circuit torque value TRQ1 that is substantially equivalent to the torque command value Tr_c.

Further, setting the value of the phase difference command selection flag to 1 causes the phase difference command selector 56 to output the second phase difference command value θd_c2 to the hydraulic source unit 30 as the phase difference command value θd_c, as in the case where the operation mode command is set to the gate-off mode command. Then, the hydraulic source unit 30 controls the hydraulic pressures of the hydraulic chambers 24 and 25 such that the actual inter-rotor phase difference θd is repeatedly increased/decreased for a predetermined number of times on the basis of the second phase difference command value θd_c2. Thus, as in the case where the operation mode command is set to the gate-off mode command, the sludge built up in the hydraulic chambers 24 and 25 flows out of the hydraulic chambers 24 and 25, solving the problem of the accumulation of sludge.

In this case, the armature of each phase of the motor 1 is short-circuited, so that the energizing current of the armatures of the motor 1 is not affected by the increasing and decreasing of the inter-rotor phase difference θd (increasing and decreasing of a resultant field), making it possible to stably maintain the torque generated in the output shaft 2 of the motor 1 at the short-circuit torque value TRQ1, which is substantially equal to the torque command value Tr_c.

After repeatedly increasing and decreasing the inter-rotor phase difference θd for a predetermined number of times as described above, the cleaning control unit 55 sets the operation mode command back to the normal mode command in STEP9, and resets the value of the phase difference command selection flag to zero in STEP10. This completes the operation of cleaning the hydraulic chambers 24 and 25.

Supplementally, the determination processing in STEP3 described above corresponds to the second operation state determining means in the present invention.

If the determination result in STEP3 is negative, then the cleaning control unit 55 sets the operation mode command to the normal mode command (STEP6). Further, the cleaning control unit 55 sets the phase difference command selection flag to 1 in STEP7 and then generates the second phase difference command value θd_c2 such that the inter-rotor phase difference θd is repeatedly increased/decreased for a predetermined number of times (STEP8). The processing in STEP8 is carried out in the same manner as that for setting the operation mode command to the gate-off mode command. In this case, however, an upper limit value and a lower limit value of the second phase difference command value θd_c2 in increasing and decreasing the inter-rotor phase difference θd are set within a range wherein a torque of the torque command value Tr_c can be smoothly generated in the output shaft 2 of the motor 1. Alternatively, for example, the upper limit value and the lower limit value of the second phase difference command value θd_c2 may be set to fixed values, and the processing in STEPs 7 and 8 may be carried out only if the torque command value Tr_c lies within the range of the values of torques that can be generated in the output shaft 2 of the motor 1 within the range of the inter-rotor phase difference θd defined by the upper limit value and the lower limit value.

By the processing in STEPs 6, 7, and 8 explained above, the PWM arithmetic unit 73 of the energization control unit 51 controls the turning ON/OFF of the switching elements of the inverter circuit 45 on the basis of the d-axis voltage command value Vd_c and the q-axis voltage command value Vq_c. Thus, the d-axis component and the q-axis component of the energizing current of the armature of each phase of the motor 1 are controlled on the basis of the d-axis current command value Id_c and the q-axis current command value Iq_c, respectively. Consequently, the torque generated in the output shaft 2 of the motor 1 is controlled on the basis of the torque command value Tr_c.

Moreover, setting the value of the phase difference command selection flag to 1 causes the phase difference command selector 56 to output the second phase difference command value θd_c2 to the hydraulic source unit 30 as the phase difference command value θd_c, as in the case where the operation mode command is set to the gate-off mode command or the short-circuit mode command. Then, the hydraulic source unit 30 controls the hydraulic pressures of the hydraulic chambers 24 and 25 such that the actual inter-rotor phase difference θd is repeatedly increased/decreased for a predetermined number of times on the basis of the second phase difference command value θd_c2. Thus, as in the case where the operation mode command is set to the gate-off mode command, the sludge built up in the hydraulic chambers 24 and 25 flows out of the hydraulic chambers 24 and 25, solving the problem of the accumulation of sludge.

In this case, the influences of delays in increasing and decreasing the actual inter-rotor phase difference θd relative to increasing and decreasing the second phase difference command value θd_c2 are compensated for by the d-axis current correction value ΔId_vol2 (=field manipulating current ΔId_vol), allowing a torque of the torque command value Tr_c to be properly generated in the output shaft 2 of the motor 1. Accordingly, a torque of the torque command value Tr_c can be properly generated in the output shaft 2 of the motor 1 while cleaning the hydraulic chambers 24 and 25.

After repeatedly increasing and decreasing the inter-rotor phase difference θd for a predetermined number of times as described above, the cleaning control unit 55 sets the operation mode command to the normal mode command in STEP9, and also resets the value of the phase difference command selection flag to zero in STEP10. This completes the operation of cleaning the hydraulic chambers 24 and 25. This completes the operation for cleaning the hydraulic chambers 24 and 25. Supplementally, at the end of the cleaning operation, if the operation mode command is the normal mode command, then the processing in STEP9 may be omitted.

Thus, according to the present embodiment, if the hydraulic chambers 24 and 25 need to be cleaned, then sludge built up in the hydraulic chambers 24 and 25 can be removed by repeatedly increasing and decreasing the inter-rotor phase difference θd. As a result, an operation failure of the phase difference changing driver 23 of the motor 1, especially the occurrence of a failure of a relative rotation of the second member 10 with respect to the first member 9, can be restrained. Further, a desired operation of the motor 1 can be continued while cleaning the hydraulic chambers 24 and 25.

In the embodiment explained above, the hydraulic chambers 24 and 25 have been cleaned in three different modes, namely, the gate-off mode, the short-circuit mode, and the normal mode. Alternatively, however, the hydraulic chambers 24 and 25 may be cleaned in only one or two modes thereamong.

Further, in the aforesaid embodiment, the inter-rotor phase difference θd_e estimated by the phase difference estimator 74 has been used to determine the d-axis current command value Id_c and the q-axis current command value Iq_c by the current command calculator 53 of the energization control unit 51. As an alternative, however, an actual inter-rotor phase difference θd may be detected using an appropriate sensor and a detection value thereof may be used in place of the estimated value θd_e. Further alternatively, the induced voltage constant Ke as a characteristic parameter having a correlation shown in FIG. 7 with the inter-rotor phase difference θd may be used in place of the estimated value or the detection value of the inter-rotor phase difference θd to determine the d-axis current command value Id_c and the q-axis current command value Iq_c by the current command calculator 53. In this case, as a value of the induced voltage constant Ke, a value estimated as described above by the phase difference estimator 74 or a value determined according to the data table as shown in FIG. 7 from a detection value of the actual inter-rotor phase difference θd may be used.

What is claimed is:

1. A controller for a motor having a first rotor and a second rotor that produce fields by permanent magnets, and an output shaft that can be integrally rotated with the first rotor of the two rotors, wherein the two rotors and the output shaft are coaxially provided, the second rotor is provided such that the second rotor can be relatively rotated with respect to the first rotor, and the phase difference between the two rotors is changed by the relative rotation of the second rotor so as to change the intensity of a resultant field obtained by combining the fields of the permanent magnets of the rotors, the controller for a motor comprising:

- a phase difference changing driving means which has a hydraulic chamber whose volume changes as the second rotor relatively rotates and which causes the second rotor to rotate relatively to the first rotor by a pressure of hydraulic oil charged in the hydraulic chamber;
- a cleaning need determining means which determines whether the hydraulic chamber needs to be cleaned; and
- a cleaning phase difference controlling means which controls the phase difference changing driving means such that the second rotor relatively rotates in the forward direction and the reverse direction alternately with respect to the first rotor in the case where the cleaning need determining means determines that cleaning is necessary.

2. The controller for a motor according to claim 1, wherein the cleaning phase difference controlling means comprises a first operating condition determining means that determines, in the case where the cleaning need determining means determines that cleaning is necessary, whether an operating condition of the motor is equivalent to an operating condition obtained in the case where it is assumed that the energization of an armature of the motor has been cut off, and in the case where a determination result given by the first operating condition determining means is affirmative, then the cleaning phase difference controlling means controls the phase difference changing driving means so as to relatively rotate the second rotor in the forward direction and the reverse direction alternately with respect to the first rotor while controlling an energizing circuit of the armature to cut off the energization of the armature of the motor.

3. The controller for a motor according to claim 1, wherein the cleaning phase difference controlling means comprises a second operating condition determining means that determines, in the case where the cleaning need determining means determines that cleaning is necessary, whether an operating condition of the motor is equivalent to an operating condition obtained in the case where it is assumed that an armature of the motor has been short-circuited, and in the case where a determination result given by the second operating condition determining means is affirmative, then the cleaning phase difference controlling means controls the phase difference changing driving means so as to relatively rotate the second rotor in the forward direction and the reverse direction alternately with respect to the first rotor while controlling the energizing circuit of the armature to short-circuit the armature of the motor.

4. The controller for a motor according to claim 1, further comprising an energization controlling means that estimates or detects a phase difference between the two rotors or a value of a characteristic parameter of the motor that has a predetermined correlation with the phase difference and controls energizing current to an armature of the motor, by using the phase difference or the value of the characteristic parameter that has been estimated or detected, while at least the cleaning phase difference controlling means is controlling the phase difference changing driving means to relatively rotate the second rotor in the forward direction or the reverse direction alternately with respect to the first rotor.

5. The controller for a motor according to claim 1, wherein the cleaning need determining means determines whether the hydraulic chamber needs to be cleaned on the basis of at least one of the rotational velocity of the output shaft of the motor and the operating time of the motor.

* * * * *